(12) United States Patent
Achiwa et al.

(10) Patent No.: US 7,194,590 B2
(45) Date of Patent: Mar. 20, 2007

(54) THREE DATA CENTER ADAPTIVE REMOTE COPY

(75) Inventors: Kyosuke Achiwa, Tokyo (JP); Takashi Oeda, Tokyo (JP); Katsunori Nakamura, Tokyo (JP); Toshio Nakano, Tokyo (JP); Mikito Ogata, Tokyo (JP); Yoshinori Okami, Tokyo (JP); Seiichi Higaki, Tokyo (JP); Hiroshi Abei, Tokyo (JP); Shigeru Kishiro, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 10/661,467

(22) Filed: Sep. 12, 2003

(65) Prior Publication Data

US 2004/0230756 A1 Nov. 18, 2004

Related U.S. Application Data

(63) Continuation-in-part of application No. 10/096,375, filed on Mar. 8, 2002, which is a continuation-in-part of application No. 09/854,125, filed on May 10, 2001, now Pat. No. 6,643,750.

(30) Foreign Application Priority Data

Feb. 28, 2001 (JP) .......................... 2001-53456

(51) Int. Cl.
*G06F 12/00* (2006.01)

(52) U.S. Cl. ........................ 711/162; 714/6; 711/161; 707/204

(58) Field of Classification Search ................ 711/162; 714/6
See application file for complete search history.

(56) References Cited

U.S. PATENT DOCUMENTS

| 3,990,055 | A |   | 11/1976 | Henderson et al. |
| 4,451,884 | A |   | 5/1984 | Heath et al. |
| 5,155,845 | A |   | 10/1992 | Beal et al. |
| 5,206,939 | A |   | 4/1993 | Yanai et al. |
| 5,235,690 | A |   | 8/1993 | Beardsley et al. |
| 5,247,665 | A |   | 9/1993 | Matsuda et al. |
| 5,379,398 | A |   | 1/1995 | Cohn et al. |
| 5,522,037 | A | * | 5/1996 | Kitagawa et al. ............. 714/40 |
| 5,544,347 | A |   | 8/1996 | Yanai et al. |
| 5,572,699 | A |   | 11/1996 | Kamo et al. |

(Continued)

FOREIGN PATENT DOCUMENTS

| JP | 58-151660 | 9/1983 |
| JP | 58-219656 | 12/1983 |
| JP | 64-033770 | 2/1989 |

(Continued)

OTHER PUBLICATIONS

Burns et al, "A linear time, constant space differencing algorithm", 1997, Performance, Computing, and Communications Conference, p. 429–436.*

(Continued)

*Primary Examiner*—Mano Padmanabhan
*Assistant Examiner*—Jasmine Song
(74) *Attorney, Agent, or Firm*—Townsend and Townsend and Crew LLP

(57) ABSTRACT

A storage apparatus configuration in a three data center architecture comprises first and second data storage systems, and a remote data storage system. The first data storage systems can copy an image of data stored therein to the remote data storage system without affecting access to storage in the first data storage system. The second data storage system is configured to perform a takeover operation if the first data storage system becomes unavailable.

3 Claims, 33 Drawing Sheets

U.S. PATENT DOCUMENTS

| | | | |
|---|---|---|---|
| 5,588,012 A | 12/1996 | Oizumi | |
| 5,613,155 A | 3/1997 | Baldiga et al. | |
| 5,625,840 A | 4/1997 | Numata et al. | |
| 5,644,787 A | 7/1997 | Nakamura et al. | |
| 5,664,144 A | 9/1997 | Yanai et al. | |
| 5,680,640 A | 10/1997 | Ofek et al. | |
| 5,692,155 A | 11/1997 | Iskiyan et al. | |
| 5,740,465 A | 4/1998 | Matsunami et al. | |
| 5,742,792 A | 4/1998 | Yanai et al. | |
| 5,819,020 A | 10/1998 | Beeler | |
| 5,835,954 A | 11/1998 | Duyanovich et al. | |
| 5,845,328 A | 12/1998 | Maya et al. | |
| 5,896,548 A | 4/1999 | Ofek | |
| 5,901,327 A | 5/1999 | Ofek | |
| 5,909,692 A | 6/1999 | Yanai et al. | |
| 5,940,865 A | 8/1999 | Ohzora et al. | |
| 5,960,216 A | 9/1999 | Vishlitzky et al. | |
| 5,978,890 A | 11/1999 | Ozawa et al. | |
| 5,996,045 A | 11/1999 | Lee et al. | |
| 6,003,114 A | 12/1999 | Bachmat | |
| 6,173,377 B1 | 1/2001 | Yanai et al. | |
| 6,185,653 B1 | 2/2001 | Yanai et al. | |
| 6,230,239 B1 | 5/2001 | Sakaki et al. | |
| 6,240,494 B1 | 5/2001 | Nagasawa et al. | |
| 6,247,046 B1 | 6/2001 | Yanai et al. | |
| 6,286,085 B1 | 9/2001 | Jouenne et al. | |
| 6,378,054 B1 * | 4/2002 | Karasudani et al. | 711/161 |
| 6,418,509 B1 | 7/2002 | Yanai et al. | |
| 6,487,645 B1 | 11/2002 | Clark et al. | |
| 6,502,205 B1 | 12/2002 | Yanai et al. | |
| 6,539,462 B1 | 3/2003 | Mikkelsen et al. | |
| 6,578,120 B1 | 6/2003 | Crockett et al. | |
| 6,587,919 B2 | 7/2003 | Yanai et al. | |
| 6,587,935 B2 | 7/2003 | Ofek | |
| 6,594,744 B1 | 7/2003 | Humlicek et al. | |
| 6,625,705 B2 | 9/2003 | Yanai et al. | |
| 6,640,291 B2 | 10/2003 | Fujibayashi et al. | |
| 6,647,473 B1 | 11/2003 | Golds et al. | |
| 6,647,474 B2 | 11/2003 | Yanni et al. | |
| 6,671,705 B1 | 12/2003 | Duprey et al. | |
| 6,760,723 B2 * | 7/2004 | Oshinsky et al. | 707/3 |
| 6,779,094 B2 | 8/2004 | Selkirk et al. | |
| 6,804,755 B2 | 10/2004 | Selkirk et al. | |
| 2002/0015336 A1 * | 2/2002 | Watkins et al. | 365/200 |
| 2002/0116404 A1 * | 8/2002 | Cha et al. | 707/202 |
| 2003/0167419 A1 | 9/2003 | Yanai et al. | |
| 2004/0167942 A1 * | 8/2004 | Oshinsky et al. | 707/204 |

FOREIGN PATENT DOCUMENTS

| | | |
|---|---|---|
| JP | 02-059934 | 2/1990 |
| JP | 03-204023 | 9/1991 |
| JP | 06-067811 | 3/1994 |
| JP | 06-250795 | 9/1994 |
| JP | 07-191811 | 7/1995 |
| JP | 07-201132 | 8/1995 |
| JP | 07-271521 A | 10/1995 |
| JP | 09-325863 | 12/1997 |
| JP | 11-338647 | 12/1999 |
| JP | 2000-305856 | 11/2000 |
| WO | WO94/25919 A1 | 11/1994 |
| WO | WO97/09676 A1 | 3/1997 |
| WO | WO 98/20419 A1 | 5/1998 |
| WO | WO 01/04754 A2 | 1/2001 |

OTHER PUBLICATIONS

Svobodova, "File Servers for Network–Based Distribution Systems", 1984 Computing Surveys, vol 16, No 4, p. 353–398.*

Rosenblum "The Design and Implementation of a Log–Structured File System," ACM Transactions on Computer Systems 10:26–52 (1992).

"Symmetrix Data Migration Services (SDMS)" EMC$^2$ Symmetrix ICDA Family Product Information (2000).

* cited by examiner

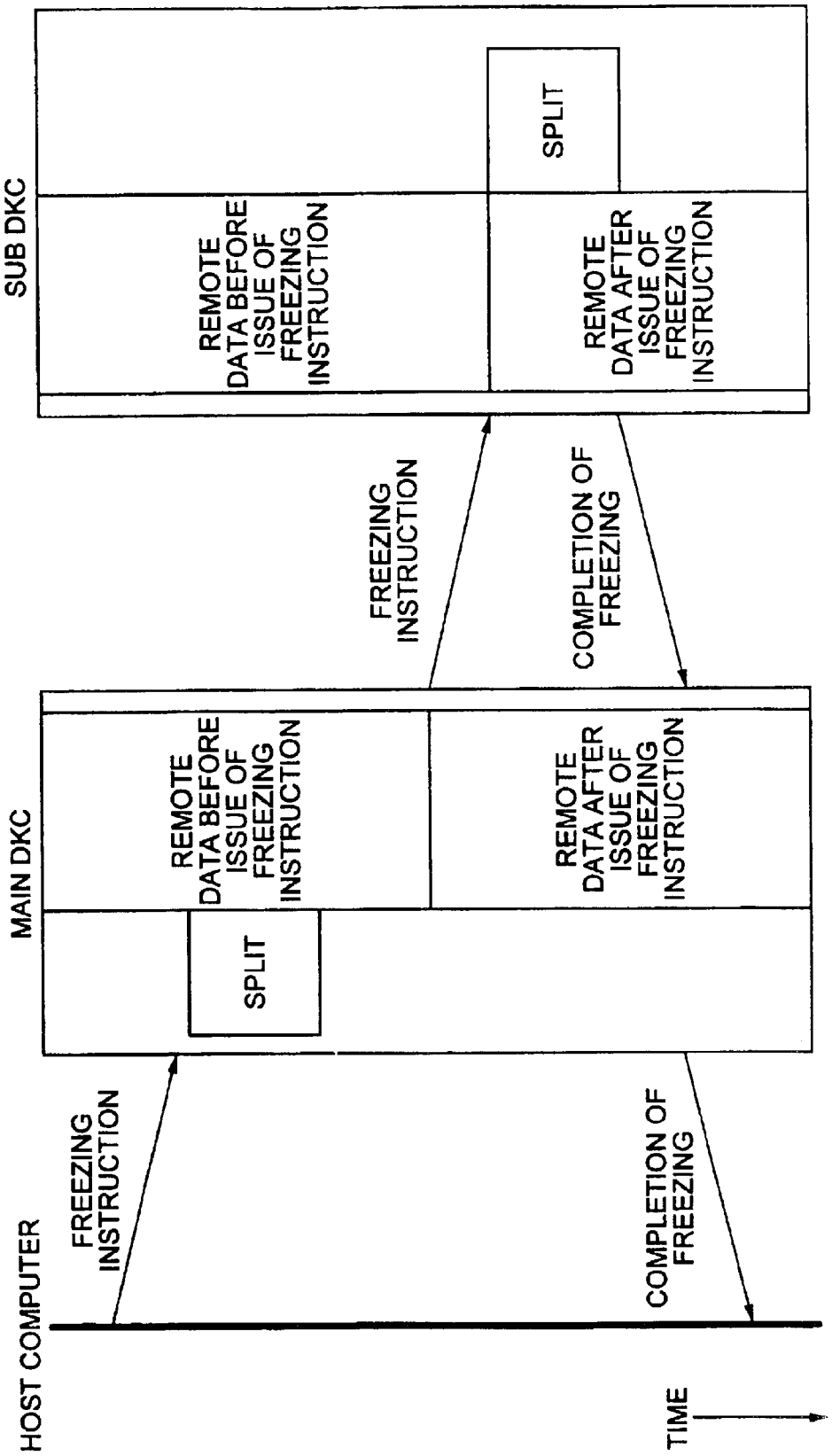

THREE DATA CENTER ADAPTIVE REMOTE COPY

CROSS REFERENCE TO RELATED APPLICATIONS

This application is a continuation in part of U.S. application Ser. No. 09/854,125, filed May 10, 2001 now U.S. Pat. No. 6,643,750 and of U.S. application Ser. No. 10/096,375, filed Mar. 8, 2002 the disclosures of are included herein by reference for all purposes.

BACKGROUND OF THE INVENTION

The present invention relates in general to a storage apparatus system for carrying out the copy (the remote copy) of data to another storage apparatus system which is located in an out-of-the-way place. More particularly, the invention relates to an information processing system for carrying out the remote copy which is of the type in which the order of writing data from a host computer to a storage apparatus system does not match the order of transmitting data from a storage apparatus system having the data written thereto to another storage apparatus system.

In an information processing system having a host computer and a plurality of storage apparatus systems, as the technology of carrying out the copy of data between the storage apparatus systems, there is known the remote copy.

By the remote copy is meant the technology in which a plurality of storage apparatus systems which are located physically apart from one another carry out the copy of the data, i.e., the double writing of the data between the storage apparatus systems without interposition of the host computer.

The storage apparatus system is a system including a plurality of storage apparatuses and a controller for controlling these storage apparatuses.

In the information processing system which carries out the remote copy, the storage apparatus systems which are respectively arranged in the places physically remote from one another are electrically connected to one another through dedicated lines or public lines. Of logical storage areas (hereinafter, referred to as "logical volumes", when applicable) which a certain storage apparatus system has, the logical volume having the same capacity as that of the logical volume subjected to the remote copy (hereinafter, referred to as "the source volume" for short, when applicable) is ensured in the storage apparatus system to which the source volume is copied. This ensured logical volume (hereinafter, referred to as "the destination volume", when applicable) is formed in such a way as to show one-to-one correspondence relation with the source volume.

The data of the source volume is copied to the destination volume through the associated one of the dedicated lines or public lines.

When the data contained in the source volume is updated, the updated data is transferred to the storage apparatus system having the destination volume through the associated one of the dedicated lines or the like and the updated data is also written to the destination volume corresponding to the source volume.

If the technique of the remote copy is employed, then in the information processing system having a plurality of storage apparatus systems, the logical volume of the same contents can be held in a plurality of storage apparatus systems.

The technique relating to the remote copy is disclosed in U.S. Pat. No. 5,742,792. In U.S. Pat. No. 5,742,792, the technique called the adaptive copy is further disclosed.

By the adaptive copy is meant one of the remote copy techniques. The adaptive copy is the remote copy method wherein before the data written from the host computer to the local storage device is copied to the remote storage device, the information exhibiting the completion of write is returned back to the host computer.

In the adaptive copy, the transmission order of data is not serialized, and hence the order of writing the data to the source volume by the host computer may be different from the order of transferring these data to the destination volume in some cases (hereinafter, such remote copy is referred to as the remote copy of "no guarantee to order", when applicable).

When the host computer writes repeatedly data to the same location in the destination volume on the basis of that property, only the data which has been written thereto lastly can be transmitted to the storage apparatus system having the destination volume. Therefore, the load on the network such as the dedicated line between the storage apparatus systems can be reduced.

On the other hand, when the host computer in which the file system used in the so-called open system is incorporated writes the data to the storage apparatus system, in general, the buffer and the like provided in the host computer, whereby an instruction to transfer the data from an application program to the file system is made asynchronously with the operation of writing the data to the storage apparatus system.

But, in the case that the data in the file is destroyed due to various problems, in order to keep the coherency of the file system structure, with respect to at least the directory and the meta-data such as i-node which are used to manage the file system, the operation of issuing an instruction to transfer the data, i.e., the directory and the meta-data from the host computer to the storage apparatus system is carried out synchronously with issuing of the write command from the application program running on the host computer to the file system. The above-mentioned technique is disclosed in an article of "The Design and Implementation of a Log-Structured File System", Mendel Resenblum and John K. Ousterhout, ACM Transactions on Computer Systems, Vol. 10, No. 1, February 1992, page 29.

By executing such a processing, even if the data in the file which is buffered in the host computer is lost due to the asynchronous writing by an abrupt power source shutdown or the like, the meta-data is not lost at all. So, the coherency of the file system structure is kept and the damage can be kept to a minimum even though the data itself is lost.

SUMMARY OF THE INVENTION

The present invention comprises a storage apparatus configuration as used in a three data center architecture. The storage apparatus comprises first and second data centers in close proximity, and a remote data center. The first data center can copy an image of data stored therein to the remote data center without affecting access to storage in the first data center. The second data center can perform a takeover operation if the first data center is down. The second data center can ascertain when the remote data center has updated its data state so that the second data center can copy an image of data stored therein to the remote data center without affecting access to storage in the second data center.

BRIEF DESCRIPTION OF THE DRAWINGS

Aspects, advantages and novel features of the present invention will become apparent from the following description of the invention presented in conjunction with the accompanying drawings, wherein:

FIG. 21 is a schematic view useful in explaining the flow of a freeze instruction in the third embodiment;

DESCRIPTION OF THE SPECIFIC EMBODIMENTS

The preferred embodiments of the present invention will hereinafter be described in detail with reference to the accompanying drawings.

Figure 1:
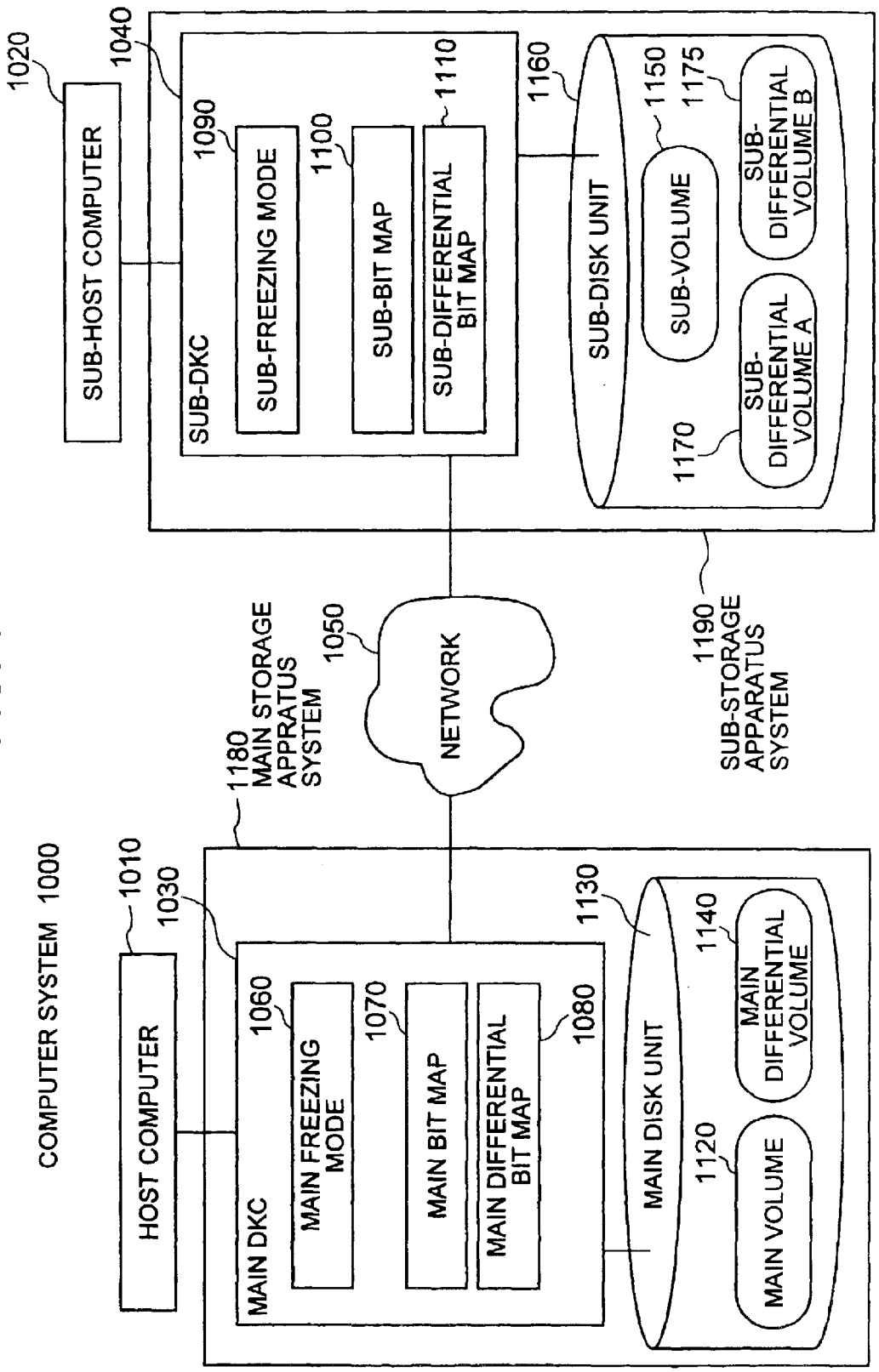
FIG. 1 is a block diagram showing a configuration of a computer system to which a first embodiment of the present invention is applied.

FIG. 1 is a block diagram showing a configuration of a first embodiment of a computer system 1000 to which the present invention is applied.

The computer system 1000 includes a host computer 1010, a main storage apparatus system 1180, a substorage apparatus system 1190 for carrying out the remote copy between the main storage apparatus system 1180 and the sub-storage apparatus system 1190, a sub-host computer 1020 and a network 1050 through which the main storage apparatus system 1180 and the sub-storage apparatus system 1190 are linked to each other.

The substorage apparatus system 1190 is used when the main storage apparatus system 1180 becomes unusable due to the calamity or the like. The sub-host computer 1020, when the host computer 1010 or the main storage apparatus system 1180 becomes unusable, takes over the processing which the host computer 1010 is expected essentially to execute, using the data in the sub-storage apparatus system 1190.

For the network 1050, it is assumed that it is the shared network such as the Internet, and the transfer rate of the data is not so high. In the present embodiment, it is assumed that the remote copy between the main storage apparatus system 1180 and the substorage apparatus system 1190 is carried out with the no guarantee to order while no heavy load is applied to the network 1050. By the way, the data transfer rate of the network 1050 may be high as well.

The main storage apparatus system 1180 includes a main disk unit 1130 in which the data transferred from the host computer 1010 is stored, and a main disk controller 1030 (hereinafter, referred to as "a DKC" for short, when applicable) for controlling the main disk unit 1130.

In the present embodiment, the host computer 1010 issues an instruction to the main storage apparatus system 1180 in such a way as to carry out "a freezing operation" (hereinafter, referred to as "the freeze instruction" when applicable).

The meaning of "freezing" is to hold, for the substorage apparatus system 1190, the same volume image as that of the main storage apparatus system 180 at a time point when the host computer 1010 has issued the instruction. Thus, when the host computer 101 issues a freeze instruction, a volume image of the main storage apparatus system 1180 is produced on the substorage apparatus system 1190.

The main disk unit 1130 includes a main volume 1120 and a main differential volume 1140. Each of the main volume and the main differential volume may be either the logical volume or the physical volume. In the case of the logical volume, as in the present embodiment, a plurality of volumes may be present in the main disk unit in some cases. On the other hand, in the case of the physical volume, the main disk unit further includes a plurality of disk units each of which constitutes the physical volume. In addition, in the case as well of the logical volume, the main disk unit may be constituted by a plurality of disk units.

In the main volume 1120, there is stored the data which has been transferred from the host computer 1010 to the main storage apparatus system 1180.

In the main differential volume 1140, for a time period ranging from a time point when the main storage apparatus system 1180 has received the freeze instruction from the host computer 1010 up to a time point when the processing of the freezing has been completed (hereinafter, such a time period is referred to as "in the freezing" for short, when applicable), there is stored the data which has been transferred from the host computer 1010.

The main DKC 1030 has a main freezing mode 1060, a main bitmap 1070 and a main differential bitmap 1080 on the memory.

The main freezing mode 1060 shows whether or not the main DKC 1030 itself is executing the process of the freezing. For example, if it is determined that the main DKC 1030 itself is executing the processing in the freezing, then the mode becomes 1.

The main bitmap 1070 and the main differential bitmap 1080 have the respective bits each corresponding to a block which the main volume 1120 has.

The main bitmap 1070 shows the blocks in the main volume 1120. These blocks are the data, which are not yet transferred to the sub-DKC 1040, among the data stored in the main volume 1120 before the main storage apparatus system 1180 receives the freeze instruction from the host computer 1010. In other words, main bitmap 1070 identifies the blocks in main volume 1120 which have not been copied to sub-DKC 1040 at the time a freeze instruction is received.

The main differential bitmap 1080 shows the blocks which contain the data which the main disk unit 1130 has received from the host computer 1010 while the main DKC 1030 is executing the process of the freezing.

The data is stored in the log-structured postscript type file format in the main difference volume 1140. The block numbers exhibiting corresponding blocks in the main volume 1120 are also contained in the stored data.

In the case where the write data to be written to the main volume 1120 is received while the main DKC 1030 is executing the process of the freezing, the main DKC 1030 checks the main differential bitmap 1080. When the write data to be written has already been present in the main differential volume 1140, the data which was written to the main differential volume 1140 prior thereto is cancelled in such a way that a plurality of data written to the same block are not present in the main differential volume 1140.

The substorage apparatus system 1190 includes a sub-disk unit 1160 in which the data which has been remote-copied from the main storage apparatus system 1180 is stored, and a sub-DKC 1040 for controlling the sub-disk unit 1160.

The sub-disk unit 1160 includes a sub-volume 1150, a sub-differential volume A 1170 and a subdifferential volume B 1175.

In the sub-volume 1150, there is stored the volume image of the main volume 1120 at a certain time point, more specifically, at a time point when the host computer 1010 previously issued the freeze instruction to the main storage apparatus system 1180. The blocks of the sub-volume 1150 and the main volume 1120 show one-to-one correspondence.

In the sub-differential volume A 1170, there is stored the data which was written to the main storage apparatus system 1180 on and after the host computer 1010 previously issued the freeze instruction to the main storage apparatus system 1180.

The sub-DKC 1040 includes a sub-freezing mode 1090, a sub-bitmap 1100 and a sub-differential bitmap 1110 on a memory (not shown).

The value of the sub-freezing mode 1090 becomes zero when the sub-DKC 1040 does not execute the process of the freezing, and becomes 1 or 2 when the sub-DKC 1040 is executing the process of the freezing.

The sub-bitmap 1100 and the sub-differential bitmap 1110 are constituted with the same number of bits as the number of blocks which the sub-volume 1150 has, and 1 bit corresponds to 1 block.

The sub-bitmap 1100 shows the presence or absence of the data which is stored in the subdifferential volume A 1170.

The sub-differential bitmap 1110 shows the presence or absence of the data which is stored in the sub-differential volume B 1175.

The data is respectively stored in the log-structured type file format in the sub-differential volume A 1170 and the sub-differential volume B 1175 similarly to the main differential volume 1140. The block numbers exhibiting the corresponding blocks in the sub-volume 1150 are also contained in the data which is respectively stored therein.

The sub-DKC 1040 executes the same processing as that in the main DKC 1030 to cancel the old data in such a way that two or more data corresponding to the same block is not present in the sub-differential volume A 1170 and the sub-differential volume B 1175.

While in the present embodiment, the host computer 1010 issues the freeze instruction, alternatively, the main DKC 1030 or the sub DKC 1040 may issue the freeze instruction.

The application program which runs on the host computer 1010 issues an instruction to write data to the main storage apparatus system 1180. But, in actuality, there may be the case where the data is written to the cache or buffer memory of the host computer 1010 and hence the contents of the data stored in the main storage apparatus system 1180 become the state which the application program does not intend (i.e., the data which ought to have been written is not yet written in actual).

If under this state, the host computer 1010 has gone down due to a shutdown of the power source, and the file system recovery program such as fsck is executed for the main storage apparatus system 1180, then there is the possibility that the data which is not reflected in the main storage apparatus system 1180 may be lost.

In order to prevent the data which is not reflected in the main storage apparatus system 1180 from being lost, the main DKC 1030 or the like should not issue freely the instruction for the freezing, but the instruction for the freezing should be issued after the host computer 1010 has written all of the unreflected data on the cache or buffer memory to the main storage apparatus system 1180.

Figure 2A:
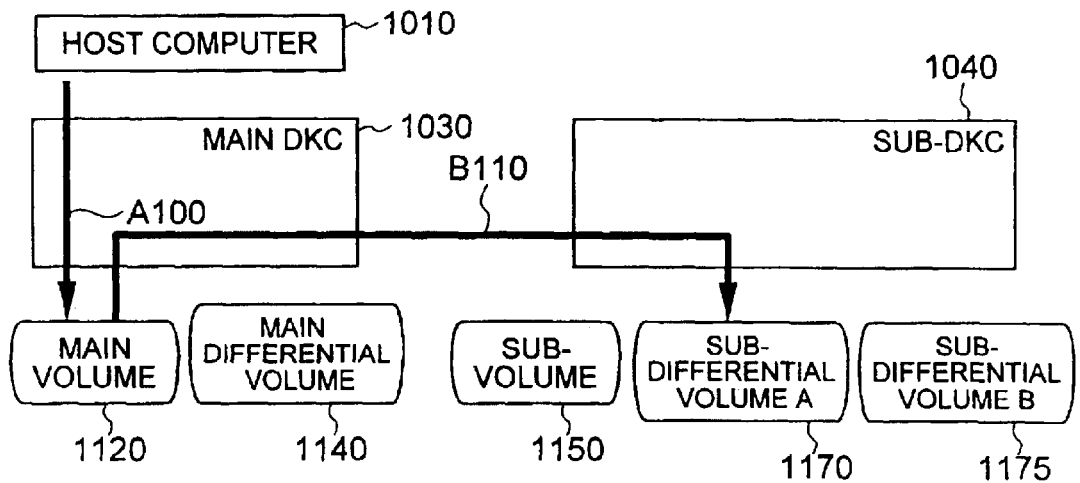
FIGS. 2A to 2C are respectively schematic views useful in explaining the flow of the data in the first embodiment.
Figure 2B:
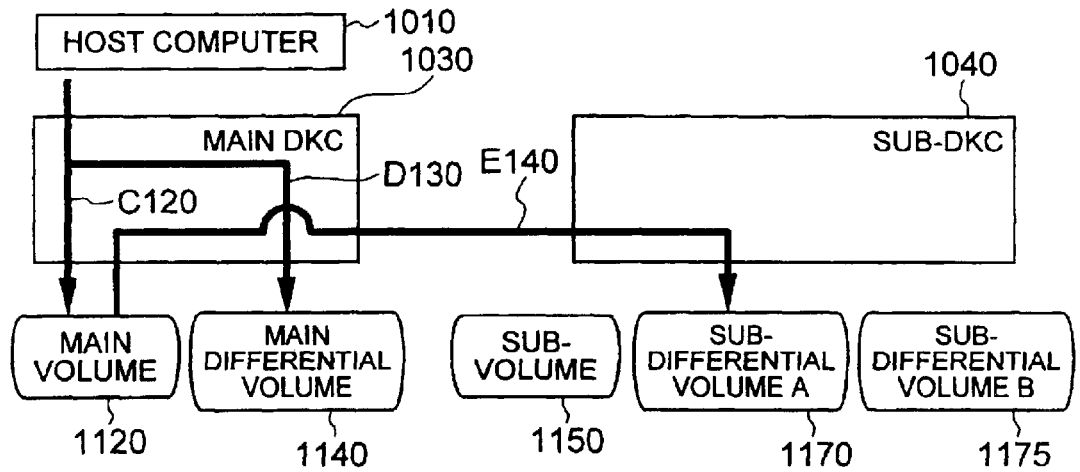
Figure 2C:
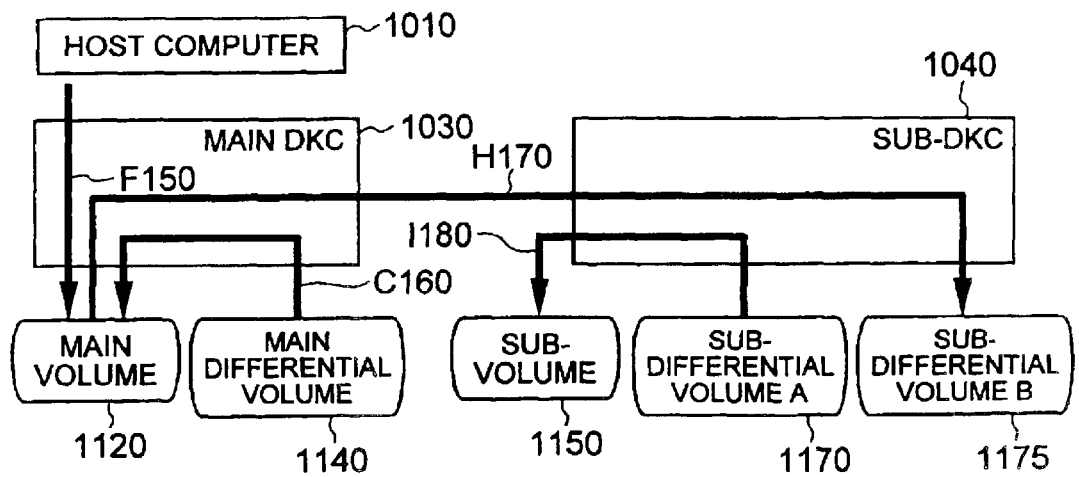

FIGS. 2A to 2C show the flow of the data in the present embodiment.

FIG. 2A is a schematic view showing the flow of the data in the state in which the host computer 1010 has not yet issued the freeze instruction, i.e., in the normal state.

The data which has been sent from the host computer 1010 is written to the main volume 1120 (indicated by an arrow A 100). The data which has been newly written to the main volume 1120 is read out from the main volume 1120 to the main DKC 1030 to be transferred to the sub-DKC 1040 to be written to the sub-differential volume A 1170 (indicated by an arrow B 110).

At an arbitrary time point in FIG. 2A, in the sub-volume 1150, there is stored the same volume image as that of the main volume 1120 at a time point when the host computer 1010 issued the freeze instruction last time.

FIG. 2B is a schematic view showing the flow of the data from a time point after the host computer 1010 issues the freeze instruction up to a time point when the main DKC 1030 issues a notification command reporting that all of the data has been sent (hereinafter, referred to as "all freezing data transmission completion", when applicable) to the sub-DKC 1040.

If the data sent from the host computer 1010 is to be stored in a block of the main disk unit 1130 that was already sent to the sub-DKC 1040 at the time when the host computer 1010 issued the freeze instruction, then the data is written to the main volume 1120 as indicated by arrow C120. On the other hand, if the data sent from the host computer 1010 is to be stored in a block which is holding data that has not yet been sent to the sub-DKC 1040, then that data is written to the main differential volume 1140, as indicated by arrow D130.

Data in a block in the main volume 1120 which has not yet been sent to the sub-DKC 1040 at the time the freeze instruction was issued is read out from the main volume 1120 to the main DKC 1030. The data is then transferred to the sub-DKC 1040 to be written to the sub-differential volume A 1170, as indicated by arrow E140.

The main DKC 1030, in accordance with the contents of the main bitmap 1070, transfers all of the difference data between the main volume 1120 and the sub-volume 1150 at a time point when the freeze instruction issued from the host computer 1010 to the sub-differential volume A 1170. After completion of all of the transfers, the main DKC 1030 informs the sub-DKC 1040 that all of the freezing data has been transferred.

At an arbitrary time point in FIG. 2B, in the sub-volume 1150, there is stored the volume image having the same contents as those of the volume image which the main volume 1120 held at a time point when the host computer 1010 issued the instruction for the freezing last time.

FIG. 2C is a schematic view showing the flow of the data from a time subsequent to when the main DKC 1030 informs the sub-DKC 1040 that all of the freezing data has been transferred. As will be explained, the main DKC 1030 updates the data stored in the main volume 1120 using the data stored in the main differential volume 1140. Also, the sub-DKC 1040, using the data stored in the sub-differential volume A 1170, updates the data which is stored in the sub-volume 1150. Data from the host computer 1010 is now written to the main volume 1120, as indicated by an arrow F150.

Data stored in the main volume 1120 is updated based on data which is stored in the main differential volume 1140, as indicated by an arrow G160. But, in the case where the block containing the data becoming an object of the update is already updated the data which has been transferred from the host computer 1010, the update of the data in the main volume 1120 corresponding to the data stored in the main differential volume 1140 is not carried out. Thus, any blocks written by the host computer 1010 after all the freezing data has been transferred to sub-DKC 1040 will not be updated from the main differential volume 1140, because the data from the host computer 1010 is more recent that the corresponding data in main differential volume 1140.

The data which has been transferred from the host computer 1010 to the main disk unit 1130 after the freeze instruction from the host computer 1010 is read out from the main volume 1120 to the main DKC 1030 to be sent to the sub-DKC 1040 to be stored in the sub-differential volume B 1175, as indicated by an arrow H170. Thus, copying of data to the sub-storage apparatus system 1190 resumes, this time with sub-differential volume B 1175 being the receiving volume, instead of sub-differential volume 1170.

The sub-DKC 1040 reads out the data in the sub-differential volume A 1170 to the sub-DKC 1040 to store that data in the sub-volume 1150, as indicated by an arrow 1180. At an arbitrary time point in FIG. 2C, the data stored in the sub-volume 1150 is combined with the data stored in the sub-differential volume A 1170, whereby the volume image of the main volume 1120 at a time point when the host computer 1010 issued the freeze instruction to the main DKC 1030 that time is reproduced. In other words, sub-volume 1150 contains a volume image representing the data state of main volume 1120 at the time the freeze instruction was issued.

From the foregoing, in FIGS. 2A and 2B, the data of the volume image having the same contents as those of the data of the volume image of the main disk unit 1120 at a time point when the freeze instruction was issued by the host computer 1010 last time is present in the sub-volume 1150. In FIG. 2C, the data of the volume image having the same contents as those of the data of the volume image in the main disk unit 1120 at a time point when the freeze instruction was issued at that time can be reproduced by combining the data stored in the sub-volume 1150 with the data in the sub-differential volume A 1170.

In other words, in any case, the volume images which are coherent with the volume images of the main disk unit 1120 at a time point when the host computer 1010 issued the freeze instruction is prepared in the sub-disk unit 1160.

Figure 1A:
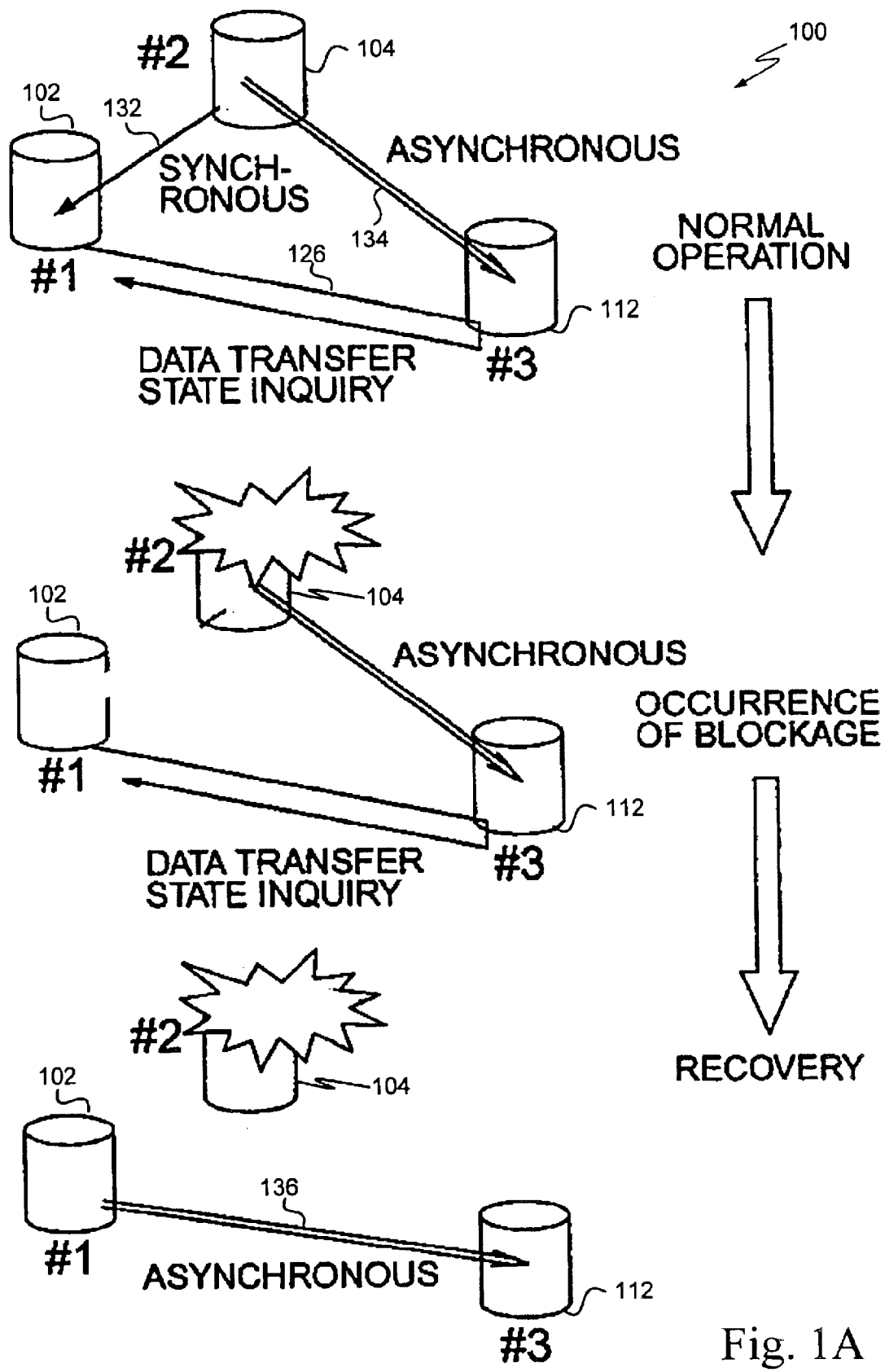
FIG. 1A illustrates a variation of the embodiment shown in FIG. 1 as used in a three data center configuration.

FIG. 1A shows an aspect of the present invention as incorporated in a three data center data storage system 100. This configuration is more fully discussed in U.S. application Ser. No. 10/096,375, and so is described briefly here. A storage sub-system is located in each of three data centers 102 (data center 1), 104 (data center 2), 112 (data center 3).

Data center 1 and data center 2 are located sufficiently close that synchronous data replication between the two data centers is practical without adverse affects as to performance. Thus, for example, data center 2 can serve as a primary data center 104 with data center 1 being a local remote copy data center 102. A write operation from a user system sent to the primary data center can be mirrored in the remote data copy center synchronously; i.e., the primary data center waits for an acknowledgement from the remote copy data center before acknowledging the user system. Synchronous operation guarantees data consistency between the primary data center and the remote copy data center.

Data center 3 is typically located a long distance away from either the primary data center 104 and the local remote copy data center 102. Data center 3 therefore serves as a "remote" data center (remote site) 112, that is protected against (or at least less susceptible to) catastrophic events that might take out both the primary data center 104 and the local remote copy data center 102.

The primary data center 104 and the remote site 112 therefore are likely to be located sufficiently far apart that the data transmission delay between the two data centers 102, 112 would render synchronous copy operations unacceptable for operational requirements (e.g., response time) of the primary data center, as determined for example by a system administrator. In accordance with this particular embodiment, the asynchronous technique of the present invention is employed as the copy method between the primary data center 104 and the remote site 112. It will also be appreciated that the local remote copy data center 102 is also configure for the asynchronous copying of the present invention.

Figure 1B:
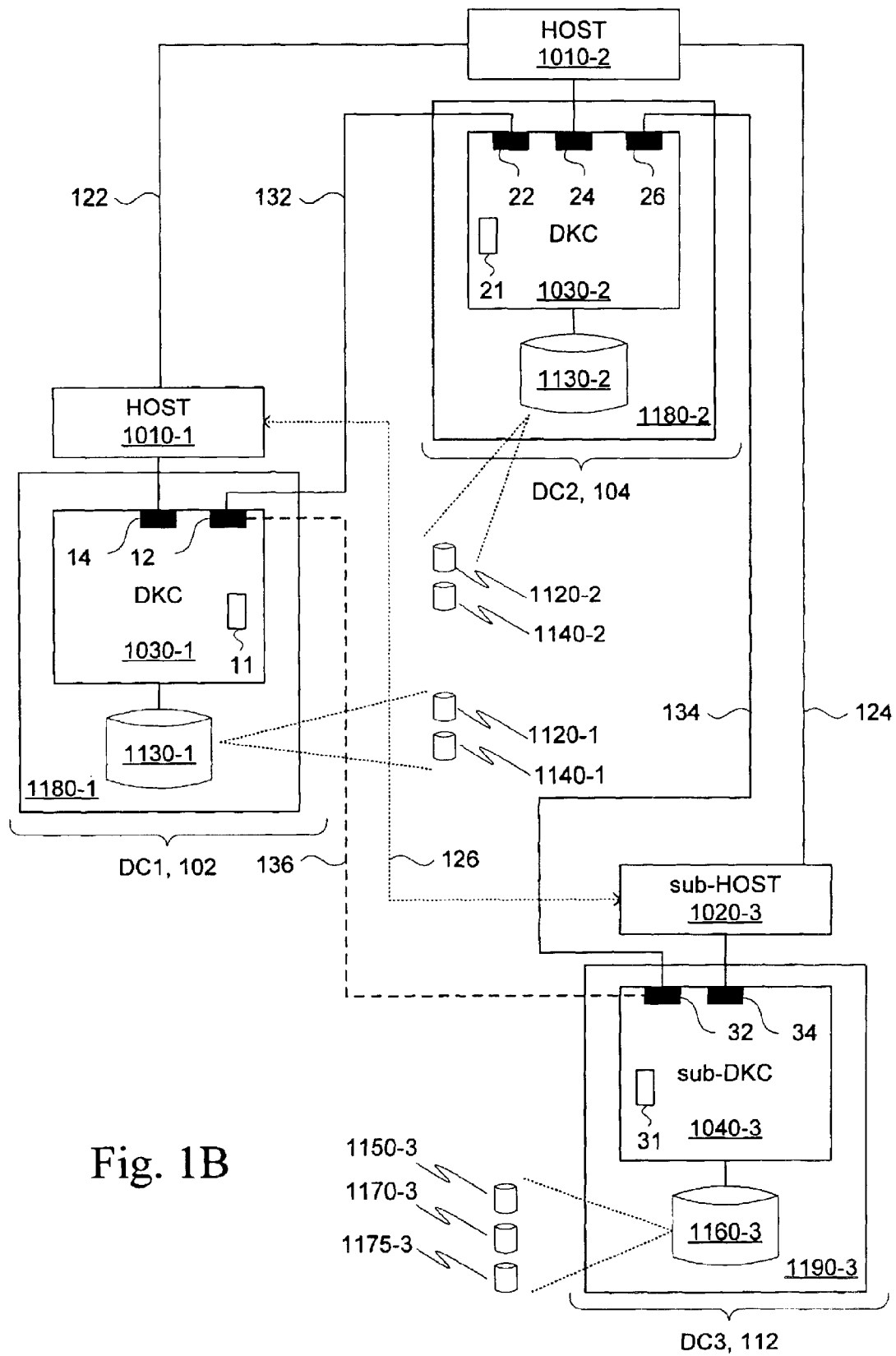
FIG. 1B shows some detail for the three data center configuration shown in FIG. 1A.

Thus, referring to FIGS. 1 and 1B, the primary data center 104 can be configured with host computer 1010-2 and a main storage apparatus 1180-2 comprising a main disk unit 1130-2 and a DKC 1060-2. Similarly, the local remote data center 102 can be configured with a host computer 1010-1 and a main storage apparatus 1180-1 comprising a main disk unit 1130-1 and a DKC 1060-1. It can be appreciated from FIG. 1 that each DKC 1030-1 and 1030-2 comprises a main freezing mode 1060 (FIG. 1), a bit map 1070, and a differential bit map. The main disk unit 1130-2 comprises main volume 1120-2 and main differential volume 1140-2. Similarly, the main disk unit 1130-1 comprises main volume 1120-1 and main differential volume 1140-1.

The remote site 112 can be configured with a sub-host computer 1020-3 and a sub-storage apparatus 1190-3 comprising a sub disk unit 1160-3 and a sub-DKC 1040-3. The DKC 1040-3 comprises a sub-freezing mode 1090 (FIG. 1), a sub-bit map 1100, and a sub-differential bit map 1110. The sub disk unit 1160-3 comprises sub-volume 1150-3, a first sub-differential volume 1170-3 and a second sub-differential volume 1175-3.

FIG. 1B also shows that DKC 1030-2 in the primary data center 104 is configured with three ports 22, 24, and 26. DKC 1030-1 in the local remote copy data center 102 is configured with two ports 12, 14. DKC 1040-3 of the remote site 112 is configured with ports 32 and 34. Host computer 1010-2 of the primary data center 104 communicates with its DKC 1030-2 via port 24. Host computer 1010-1 of the local remote copy data center 102 communicates with its DKC 1030-1 via port 14. Sub-host computer 1020-3 of the remote site 112 communicates with its DKC 1040-3 via port 34.

A host communication path 122 is provided between host computer 1010-2 of primary data center 104 and host computer 1010-1 of local remote copy data center 102. A host communication path 126 is provided between host computers 1010-1 and 1020-3. A data communication path 132 is provided between DKC 1030-2 and 1030-1, via ports 22 and 12, respectively. Similarly, a host communication path 124 is provided between host computer 1010-2 of primary data center 104 and sub-host computer 1020-3 of the remote site 112. A data communication path 134 is provided between DKC 1030-2 and DKC 1040-3, via ports 26 and 32 respectively. It can be appreciated that each of the communication paths 122, 124, 126, 132, and 134 can include a path through one or more communication networks, or can be a dedicated link. For example, the data communication path 132 can be a dedicated line for very high speed communication, while the host communication path 122 can be via a communication network. The communication paths 124, 134 are likely to span one or more communication networks, since the remote site 112 is typically far away from either the primary data center 104 and the local remote copy data center 102.

Referring to FIGS. 1A and 1B, in accordance with normal operations, the primary data center receives storage access requests from user systems (not shown). Data access is made with respect to the main storage 1130-2 of the primary data center 104. Data associated with a write operation is mirrored on the local remote copy data center 102 in a synchronous manner over data communication path 132. The data is also mirrored at the remote site 112, but in an asynchronous manner as discussed above in connection with FIGS. 1 and 2A–2C, using data communication path 134.

Occasionally, the primary data center 104 becomes unavailable. For example, routine maintenance activity might require that the primary data center be taken offline for a period of time. When some activity occurs that causes the primary data center 104 to go offline, a failover (takeover) operation can be performed so that the local remote copy data center 102 can take over the functions of the primary data center, such as receiving and processing storage access requests. For convenience, the local remote copy data center 102 can now be referred to as the "takeover center."

Another function that is taken over by the takeover center 102 is data mirroring to the remote site 112. From the discussion of asynchronous copy given above, it can be appreciated that the data state of the data at the primary data center 104 (and also the takeover center 102) is different from the data state of the remote site 112. Referring to FIG. 1B, the data state of the data on the sub-volume 1150-3 of the remote site 112 is different from the data state of the main volume 1120-2 of the primary data center.

Consider the case that host computer 1010-2 in the primary data center 104 is down, and that the storage apparatus 1180-2 remains operational. In this case, the storage apparatus 1180-2 can still communicate with the remote site 112, as indicated in FIG. 1A. In this embodiment of the invention, the takeover center 102 can be configured to communicate a freeze operation to the DKC 1030-2 of the primary data center 104 (via the communication path 132, for example). Thus, even if the host unit 1010-2 is not operational, the image contained in its main volume 1120-2 can be copied to the sub-storage apparatus 1190-3 according to the processing of the freeze command discussed above. Eventually, the remote site 112 will have an image of the primary data center 104 (and therefore, of the takeover center 102) at the time of failover.

Since the exchange of data during freeze operation processing occurs only between storage apparatus 1180-2 of the primary data center 104 and the sub-storage apparatus 1190-3 of the remote site 112, the takeover center 102 has no information as to the progress of the exchange. Therefore, an aspect of the present invention, as embodied in this particular embodiment, FIG. 1A shows a data transfer state inquiry that is made by the takeover center 102 to the remote site 112 over communication path 126. As discussed above in connection with FIG. 2B, after completion of all the transfer of data, DKC 1030 (in the primary data center 104) communicates a completion signal to DKC 1040 (in the remote site 112) indicating that the freezing data (i.e., image data) has been transferred. Thus, prior to receiving the completion signal, the remote site 112 can respond to a data transfer state inquiry (from the takeover center) with an indication that the data transfer has not completed. After receiving the completion signal, the remote site can respond to a data transfer state inquiry (from the takeover center) with an indication that the data transfer has completed.

Figure 1C:
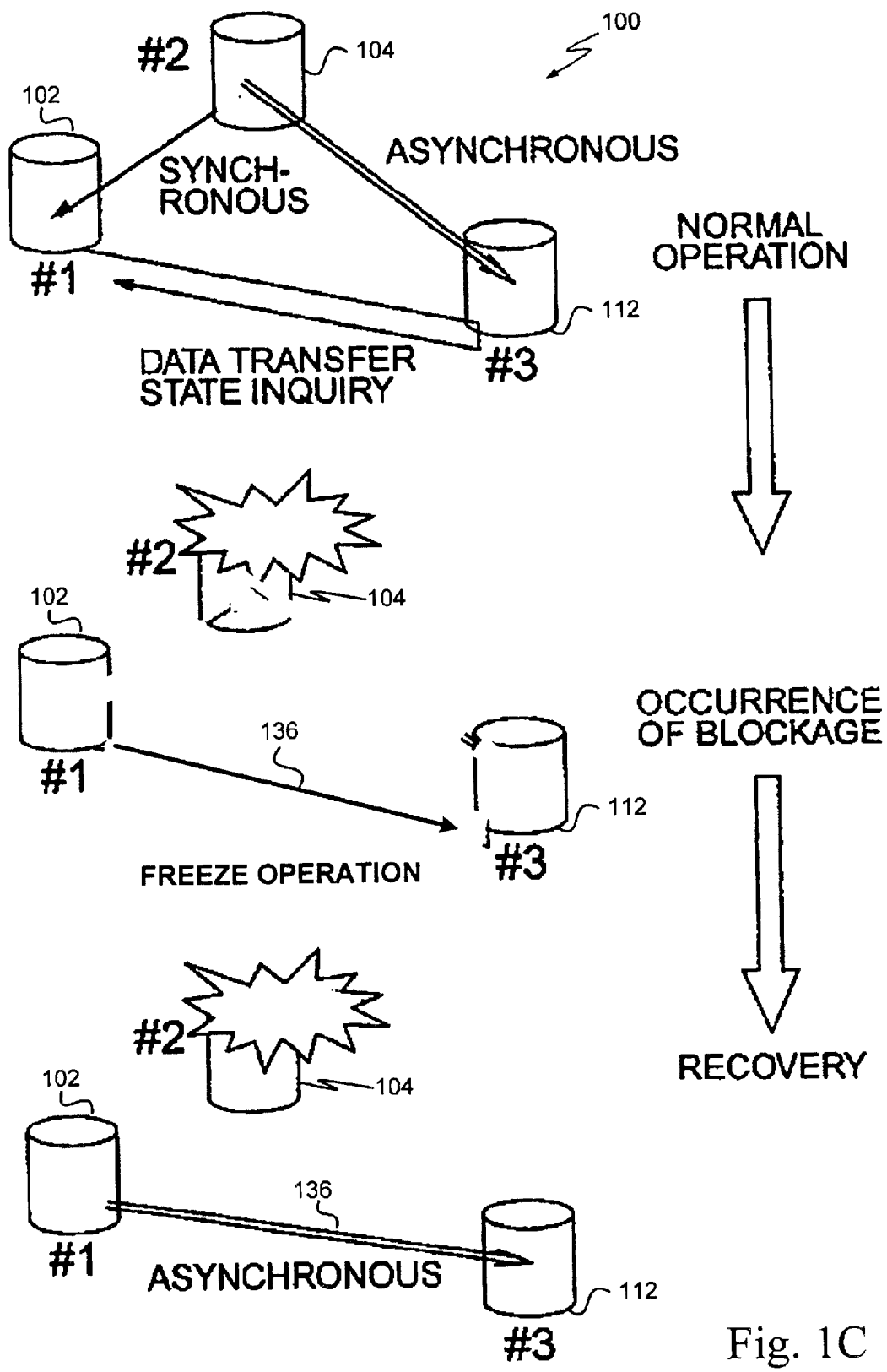
FIG. 1C illustrates a failover scenario with recovery.
Figure 1D:
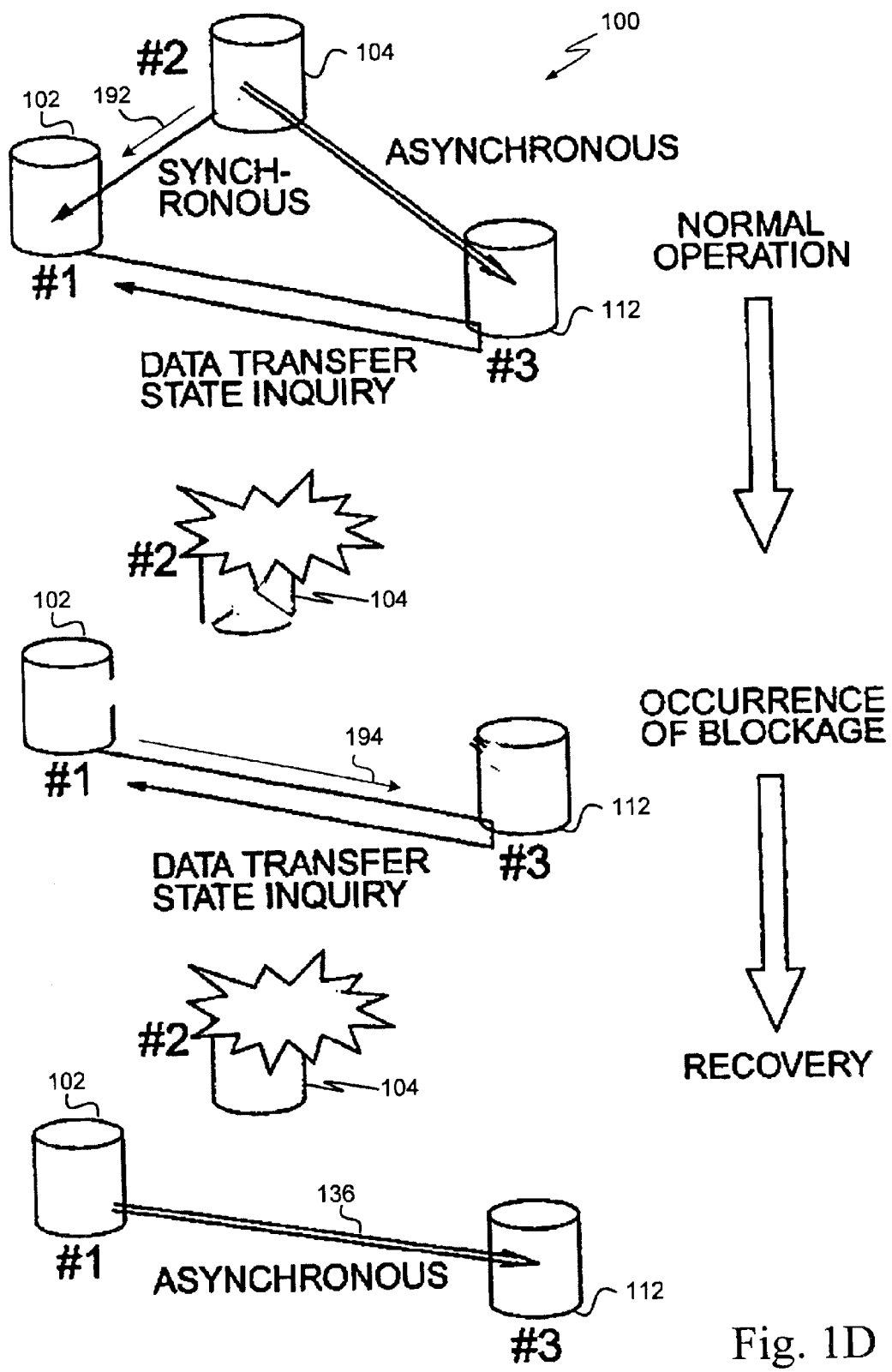
FIG. 1D illustrates a second failover scenario with recovery.
Figure 1E:
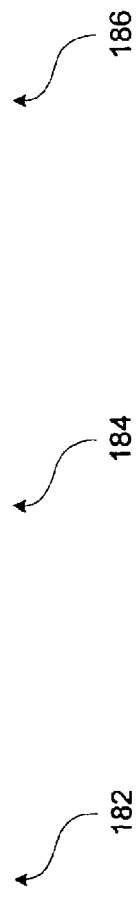
FIG. 1E shows a illustrative implementation of a transfer state bit map.

Referring to FIGS. 1A, 1B, and 1E, in another aspect of the invention, the data transfer state inquiry can employ a transfer state/bit map mechanism. This mechanism is discussed more fully in U.S. application Ser. No. 10/096,375.

Consequently, only a brief discussion will be presented herein. FIG. 1E is a diagram showing an example table for the transfer state/bit map (hereinafter referred to as a bit map, as needed). A bit map is provided in each of the data centers 102, 104, 112. Thus, the takeover center 102 includes a transfer state/bit map 11 and the remote site 112 includes a transfer state/bit map 31. The bit map is used between any two data centers that will be paired at failover during recovery from a disaster or a blockage. For example, in FIG. 1A, the takeover center 102 and remote site 112 are paired to cope with the unavailability of the primary data center 104.

The transfer state/bit map is an embodiment of an aspect of the invention to facilitate the paired data centers. Each bit map is employed to manage a difference with the logical volume of its paired partner. A block number field 182 corresponds to a block that is a minimum data unit for managing the update of the logical volume.

The host I/O data units need not be the same size as the data unit of a block. The unit of the host I/O is normally 512 bytes, at the minimum, and an upper limit is also set; however, these are variable. The bit map is slightly smaller than 50 KB or around 700 kB; however, it can have various sizes ranging from 20 KB to 1000 KB. One bit map does not always correspond to one block of host I/O data.

When the contents of the block corresponding to the block number are updated, differential management is conducted for all the data for the pertinent block number, and at the time of synchronization (resync), all the data for the block number is transmitted. For each block number, the bit map is used as the unit for which the logical volume is updated. An "Update" information to be transmitted to another logical volume is waited for, so that only the updated block need be transmitted in order to reconstruct (re-synchronize) the pair of logical volumes used for remote copy. In other words, when the Update flag 184 is ON (1 in the embodiment in FIG. 1E), it means that the pertinent data is the transmission target. Once a normal Update is performed by the command unit of the host, the Update flag is set to 0, based on the counter value of 0.

The bit map has a counter value field 186 whereat updates repeated multiple times are recorded using the same block number. For example, the counter value is 0 for no update, or is 3 when the updating was repeated three times. When the size of a data block represented by a block number is larger than a data block updated by the host, the counter value is employed so that only the updated data can be transmitted to the logical volume partner.

A block number and a counter value specified in "data transfer state inquiry command" are compared with the block number and the counter values of the bit map of the data center that receives the transfer state inquiry. If the counter value stored in the data center is equal to or greater than the counter value included in the transfer state inquiry", then the value is transmitted to the requesting data center and the counter value of the bit map of the requesting data center is decremented by one. If the counter value in the receiving data center is smaller than the counter value in the transfer state inquiry, then the counter value of the bit map in the requesting data center is unchanged.

If the counter value of the bit map of the receiving data center is equal to or greater than the counter value in the received transfer state inquiry, then the data updating status indicates that the data has already been stored. If the counter value of the bit map in the receiving data center is less than the counter value indicated in the transfer state inquiry, then it means that data has not yet been received.

The counter value in FIG. 1E is finite, and when, for example, one byte is allocated as the counter value, the management process cannot be performed more than 256 times. In this example, when the same block has been updated over 256 times, the counter value is not incremented any longer, and the Update flag is set permanently. That is, in FIG. 1E, information representing "Over Flow" is stored in the counter value. When this overflow condition arises, a release (i.e., entering a value of 0) of the Update flag of the block, which is specified in the bit map and which is permanently set, is not performed until the data center having this bit map acknowledges that the data transmission to the partner data center has completed, namely, the data has been received and is stored.

Thus, based on the transfer state bit maps, the takeover center 102 can determine that the data state of the remote site 112 is updated and is the same as the data state of the takeover center. At this point, the takeover center 102 can establish a data communication path 136 with the remote site 112. Further details of this aspect of the invention are discussed in U.S. application Ser. No. 10/096,375. The remote site 112 now has the same image as the primary data center, and hence the takeover center 102. Since the takeover center is configured similarly to the primary data center 104, asynchronous copying from the takeover center 102 to the remote site 112 can be performed in accordance with the present invention using the communication path 136.

Referring now to FIG. 1C, consider the case where both the host unit 1010-2 and storage apparatus 1180-2 become unavailable. The remote site 112 would not be able to update its image of the primary data center 104 because storage apparatus 1180-2 is unavailable. In accordance with another aspect of the present invention, when the local remote copy data center 102 becomes the takeover center, it attempts to communicate a freeze operation to the storage apparatus 1180-2. Failing to do so (because it is unavailable), the takeover center 102 establishes the communication path 136 to the remote site 112. Since the data state of the takeover center is the same as that of the primary data center 104, the takeover center can initiate a freeze operation with the remote site 112, using its DKC 1030-1 and its main volume 1120-1 to update the image at the remote site. After that, asynchronous copying from the takeover center 102 to the remote site 112 can be performed in accordance with the present invention using the communication path 136.

Referring now to FIG. 1D, consider again the case where both the host unit 1010-2 and storage apparatus 1180-2 become unavailable. The remote site 112 would not be able to update its image of the primary data center 104 because storage apparatus 1180-2 is unavailable. In another aspect of the present invention, as illustrated in the embodiment shown in FIG. 1D, data journaling is provided. During normal operation, the primary data center 104 communicates journal data 192 to the local remote copy data center 102, in addition to the data that is mirrored at the local remote copy data center. Each time the primary data center issues a freeze operation, it will reset its journal data. The journal data, likewise, is reset at the local remote copy data center 102.

When the primary data center becomes unavailable, the locate remote copy data center 102 becomes the takeover center and attempts to initiate a freeze operation with the storage apparatus 1180-2 of the downed primary data center. Failing to do so, the takeover center 102 established the communication path 136 to the remote site 112. The takeover center then communicates its journal data 194 to the remote site 112; for example, over the communication path 136. This allows the remote site 112 to update its image to be the same as the image in the takeover center 102. The transfer state/bit map mechanism described in U.S. application Ser. No. 10/096,375 can be used to allow the takeover center to determine when the remote site 112 has completed its update operations with the journal entries.

Figure 3:
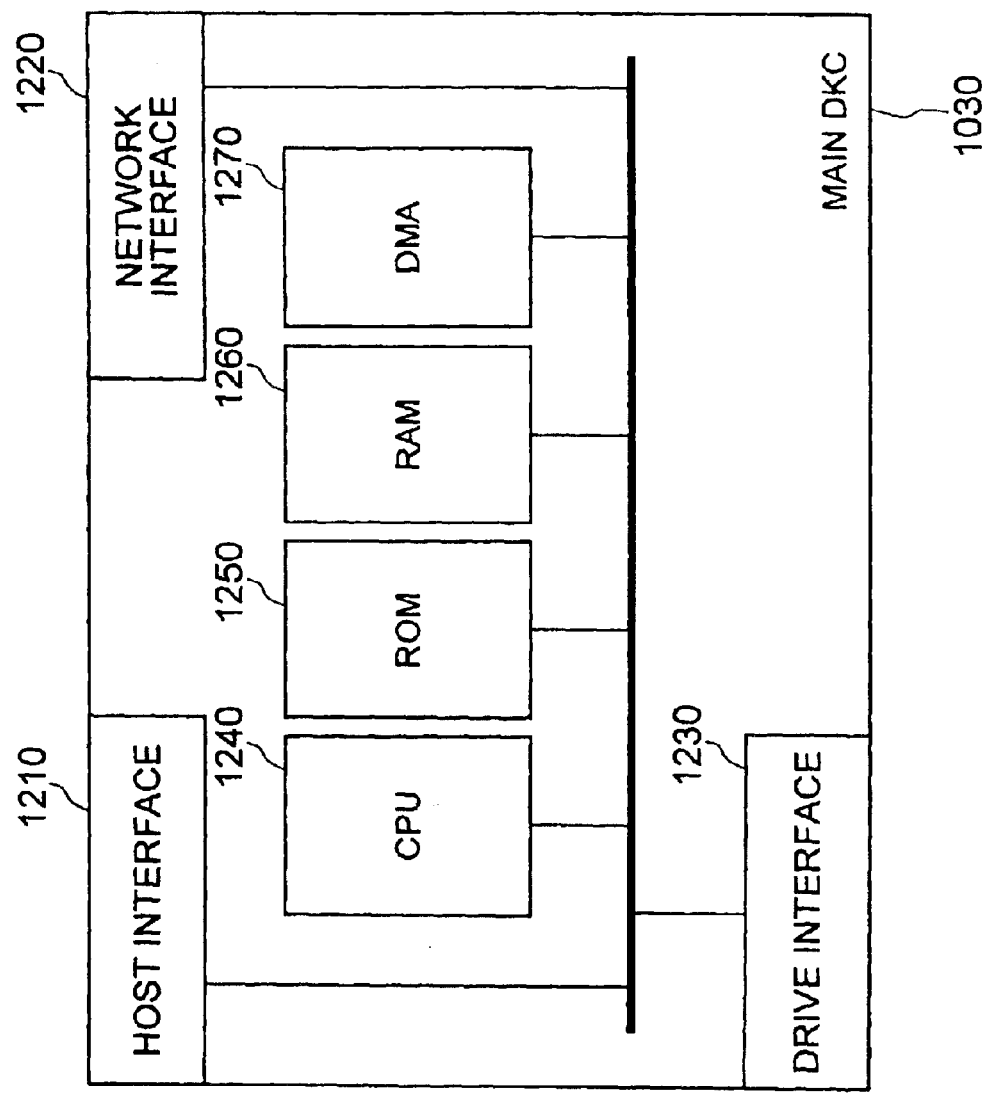
FIG. 3 is a block diagram showing an internal configuration of a DKC.

FIG. 3 is a block diagram of the main DKC 1030.

The main DKC 1030 includes a host interface 1210, a drive interface 1230, a network interface 1220, a CPU 1240, a ROM 1250, a RAM 1260, and a direct memory access controller 1270.

The program which runs on the CPU 1240 is stored in the ROM 1250.

The main freezing mode 1060, the main bitmap 1070, and the main differential bitmap 1080 are stored in the RAM 1260. The RAM is also used as the cache memory.

The CPU 1240 controls the main storage apparatus 1180. In the CPU 1240, a multitask operating system is running, so a write processing 2000, a main freezing processing 2600 and the like can be processed in parallel with one another.

The sub-DKC 1040 has also the same configuration as that of the main DKC 1030. But, in the sub-DKC 1040, the host interface 1210 is electrically connected to the sub-host computer 1020, and the drive interface 1230 is electrically connected to the sub-disk 1160. In the RAM 1260, the sub-freezing mode 1090, the sub-bitmap 1100 and the sub-differential bitmap 1110 are stored.

Figure 4:
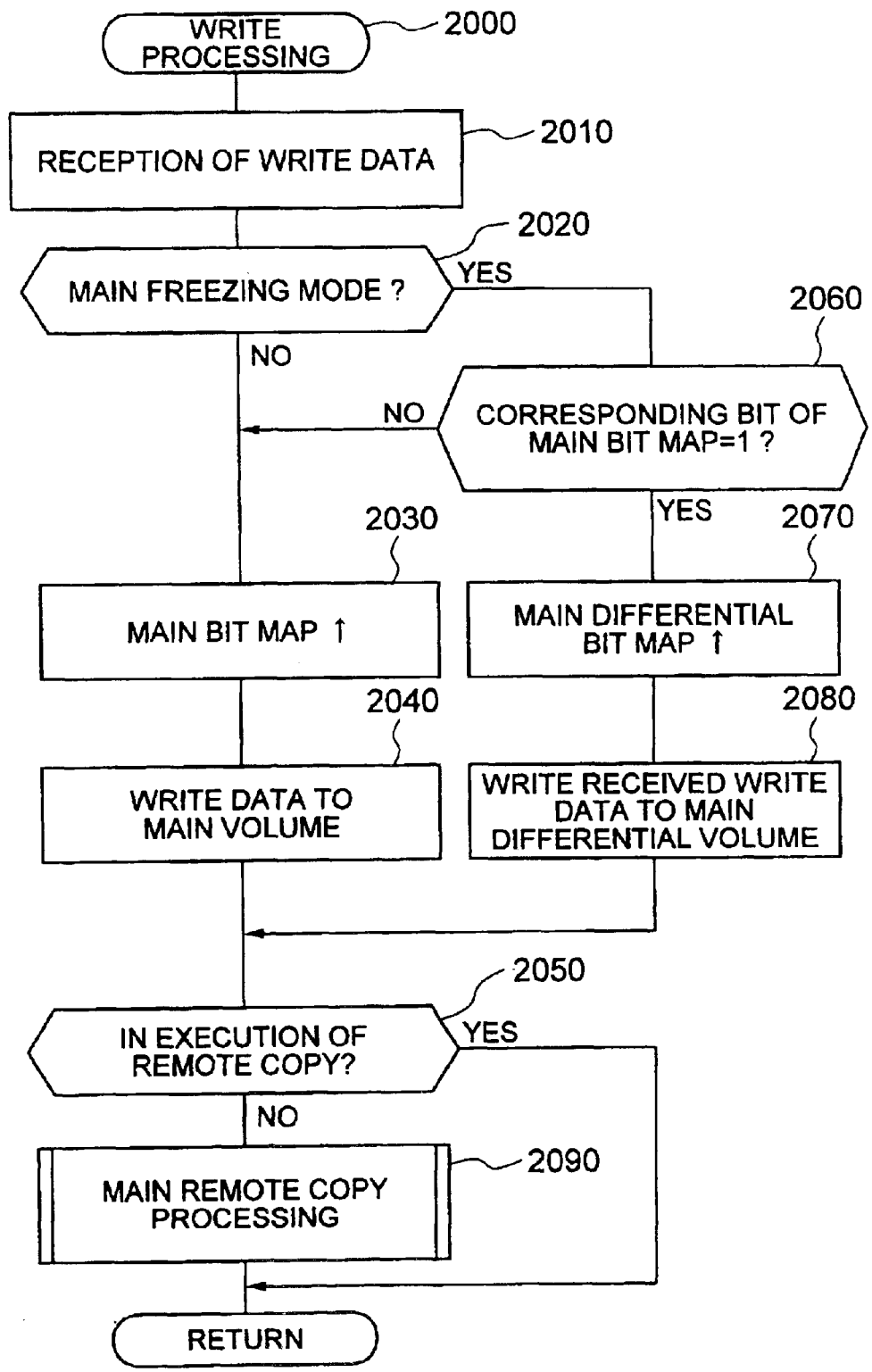
FIG. 4 is a flow chart useful in explaining the write processing in the first embodiment.

FIG. 4 is a flow chart of the write processing 2000 which is executed in the main DKC 1030 when the host computer 1010 sends the write command to write data and the data to be written (hereinafter, referred to as "the write data" for short, when applicable) to the main storage apparatus system 1180.

The main DKC 1030 receives the write data through the host interface 1210 (Step 2010) to judge whether or not the main freezing mode 1060 stored in the RAM 1260 is in the ON state (Step 2020).

If it is determined in Step 2020 that the main freezing mode 1060 is in the OFF state, then the main DKC 1030 sets to 1 the bit of the main bitmap 1070 corresponding to the block having the main volume 1120 to which the write data received by the main DKC 1030 is written (Step 2030).

The main DKC 1030 controls the main disk unit 1130 in such a way that the write data is written to the main volume 1120 (Step 2040). The main DKC 1030 itself judges whether or not a main remote copy processing 2200 is being executed (Step 2050). If it is determined in Step 2050 that the main remote copy processing 2200 is not being executed, then the remote processing is completed after the main DKC 1030 has executed the main remote copy processing 2200. On the other hand, if it is determined in Step 2050 that the main remote copy processing 2200 is being executed, then the write processing 2000 is completed.

If it is determined in Step 2020 that the main freezing mode 1060 is in the ON state, then the main DKC 1030 judges whether or not the bit of the main bitmap 1070 corresponding to the block to which the received write data is to be written is 1 (Step 2060). If it is determined in Step 2060 that the corresponding bit is zero, then the processing in Step 2030 is executed. On the other hand, if it is determined in Step 2060 that the corresponding bit is 1, then the bit of the main differential bitmap 1080 corresponding to the block in the main volume 1120 in which the received write data is to be stored is set to 1 (Step 2070).

The main DKC 1030 controls the main disk unit 1130 in such a way that the block number information in the main volume 1120 is added to the received write data, and then the write data is written to the main differential volume 1140 (Step 2080). Thereafter, the processing in Step 2050 is executed.

Figure 5:
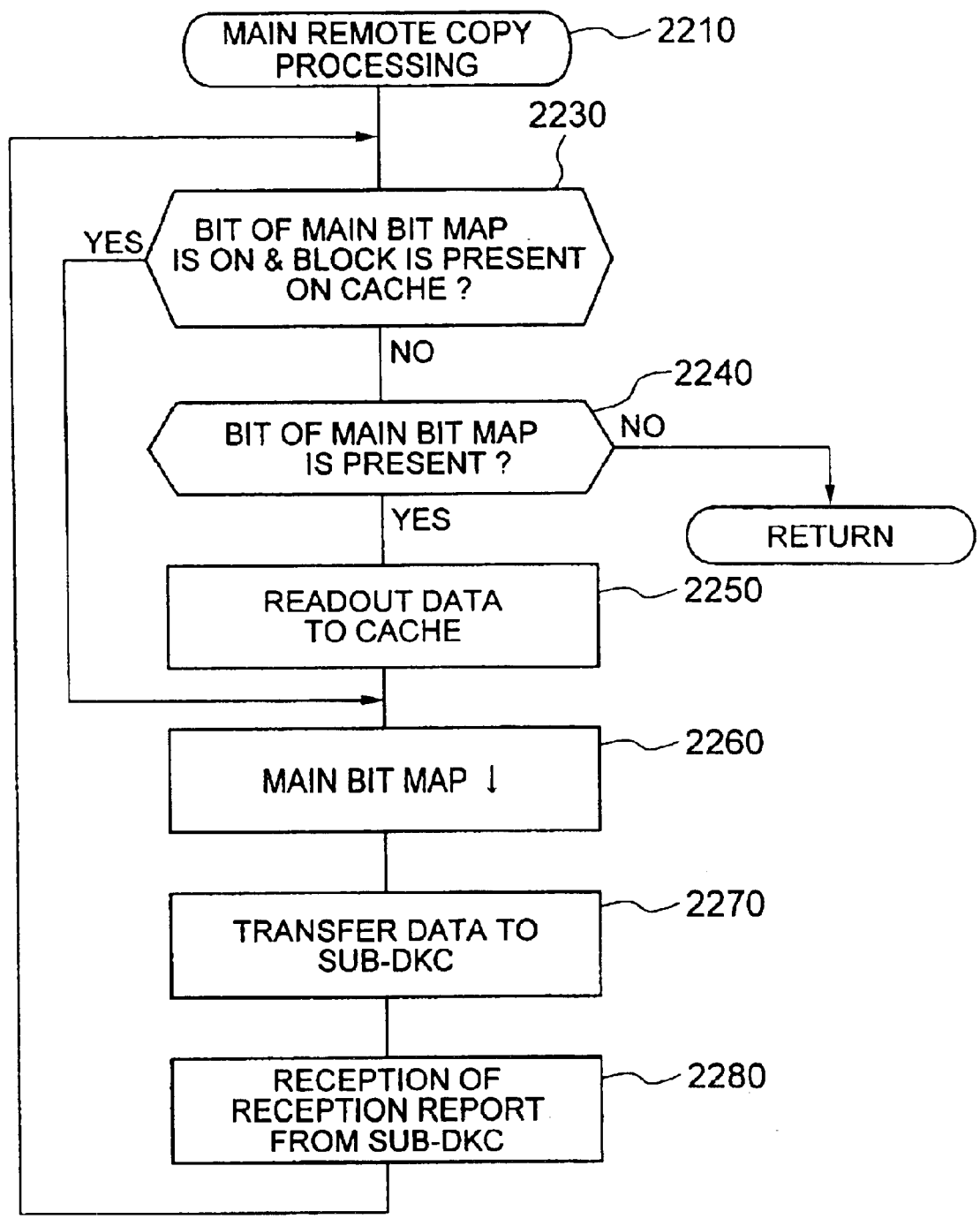
FIG. 5 is a flow chart useful in explaining the main remote copy processing in the first embodiment.

FIG. 5 is a flow chart in explaining a main remote copy processing 2200 which the main DKC 1030 executes.

The main remote copy processing 2200 is the processing which is called from the above-mentioned write processing 2000 and from the main freezing processing 2600 which will be described later.

The main DKC 1030 judges whether or not the corresponding bit of the main bitmap 1070 is 1 and also whether or not the block which contains the data stored in the RAM 1260 is present in the main volume 1120 (Step 2230). If it is determined in Step 2230 that the block corresponding to the condition is present therein, then the main DKC 1030 specifies the block of interest to execute the processing in Step 2260.

On the other hand, if it is determined in Step 2230 that the block corresponding to the condition is absent, then the main DKC 1030 judges whether or not the bit of 1 is present in the main bitmap 1070 (Step 2240). If it is determined in Step 2240 that the bit of 1 is not present in the main bitmap 1070, then the main remote copy processing 2200 is completed.

On the other hand, if it is determined in Step 2240 that the bit of 1 is present in the main bitmap 1070, then the main DKC 1030 specifies the block corresponding to the bit of 1 in the main bitmap 1070 to read out the data in the block thus specified from the main volume 1120 to store the data thus read out in the RAM 1260 (Step 2250).

The main DKC 1030 makes zero the bit of the main bitmap 1070 corresponding to the specified block (Step 2260). The main DKC 1030 transfers the data, which has been read out, to the sub-DKC 1040 through the network interface 1220 (Step 2270).

After having received the report, from the sub-DKC 1040, that the sub-DKC 1040 received the data of interest (Step 2280), the main DKC 1030 returns back to the processing in Step 2230.

Figure 6:
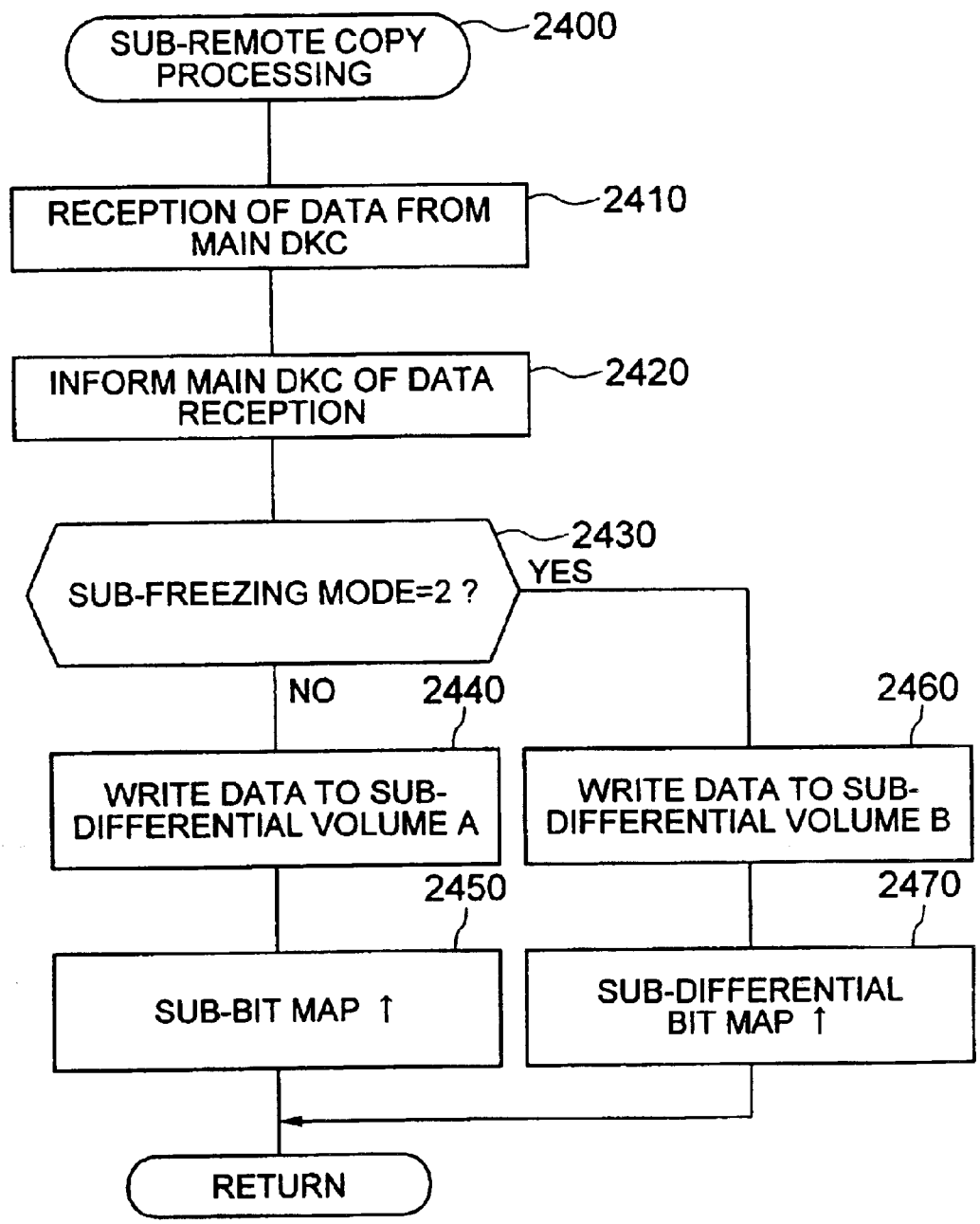
FIG. 6 is a flow chart useful in explaining the sub-remote copy processing in the first embodiment.

FIG. 6 is a flow chart useful in explaining a sub-remote copy processing 2400 which the sub-DKC 1040 executes at the time when the main DKC 1030 has sent the data to the sub-DKC 1040.

The sub-DKC 1040 receives the data which has been sent from the main DKC 1030 through the network interface 1220 (Step 2410), and then transmits the report exhibiting the reception of the data to the main DKC 1030 (Step 2420).

The sub-DKC 1040 judges whether or not the value of the sub-freezing mode 1090 stored in the RAM 1260 is 2 (Step 2430), and if it is determined in Step 2430 that the value of interest is not 2, controls the sub-disk unit 1160 in such a way that the received data is written to the sub-differential value A 1170 (Step 2440).

The sub-DKC 1040 makes 1 the bit of the sub-bitmap 1100 corresponding to the block having the written data to complete the sub-remote processing 2400 (Step 2450).

On the other hand, if it is determined in Step 2430 that the value of the sub-freezing mode 1090 is 2, then the sub-DKC 1040 controls the sub-disk unit 1160 in such a way that the received data is written to the sub-differential value B 1175 (Step 2460).

The sub-DKC 1040 sets to 1 the bit of the sub-differential bitmap 1110 corresponding to the block having the written data to complete the sub-remote copy processing 2400 (Step 2470).

Figure 7:
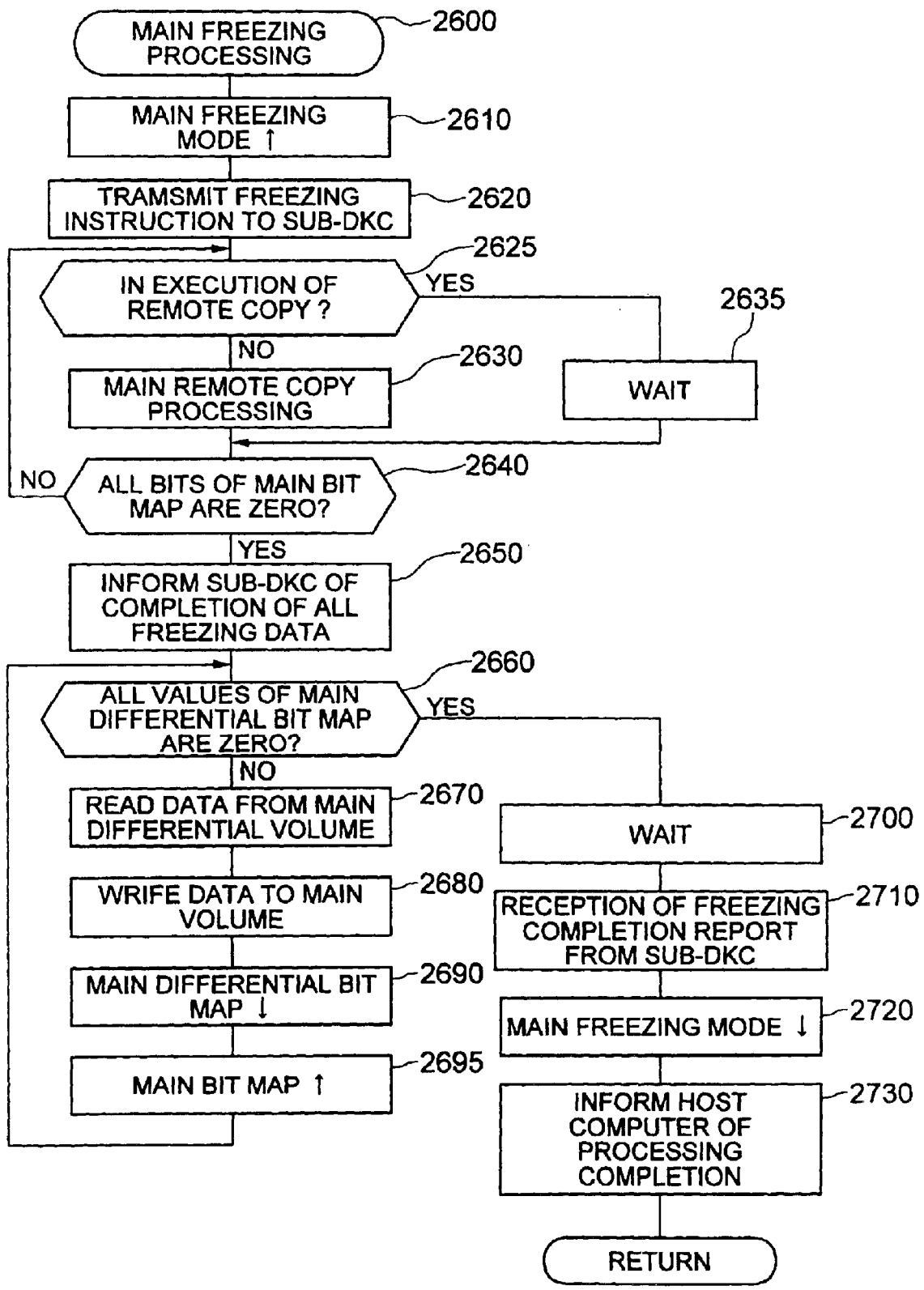
FIG. 7 is a flow chart useful in explaining the main freezing processing in the first embodiment.

FIG. 7 is a flow chart useful in explaining a main freezing processing 2600 which the main DKC 1030 executes at the time when the host computer has issued the freeze instruction.

After having received the freeze instruction from the host computer 1010 through the host interface 1210, the main DKC 1030 turns ON the main freezing mode 1060 which is stored in the RAM 1260 (Step 2610).

The main DKC 1030 transmits the freeze instruction to the sub-DKC 1040 (Step 2620). The main DKC 1030 judges whether or not the main DKC 1030 itself is executing the remote copy processing 2200 (Step 2625).

If it is determined in Step 2625 that the main DKC 1030 itself is executing the remote copy processing 2200, then the main DKC 1030, after having carried out the step of waiting for some time (e.g., several milliseconds) (Step 2635), executes the processing in Step 2640.

On the other hand, if it is determined in Step 2625 that the main DKC 1030 itself is not executing the remote copy processing 2200, then the main remote copy processing 2200 is executed (Step 2630) to execute the processing in Step 2640.

In Step 2640, the main DKC 1030 judges whether or not all of the bits of the main bitmap 1070 are zero. If the bit exhibiting 1 is present in the main bitmap 1070, then since the data to be sent to the sub-DKC 1040 still remains in the main disk unit 1130, the main DKC 1030 executes again the processings after Step 2625 until all of the bits of the main bitmap 1070 have become zero.

On the other hand, if it is determined in Step 2640 that all of the bits of the main bitmap 1070 are zero, then the main DKC 1030 transmits the information, that the freezing data has already been transmitted, to the sub-DKC 1040 (Step 2650).

The main DKC 1030 judges whether or not all of the values of the main differential bitmap 1080 are zero (Step 2660).

If it is determined in Step 2660 that all of the values of the main differential bitmap 1080 are not zero, then the main DKC 1030 controls the main disk unit 1130 in such a way that the data of the block, in which the bit in the main differential bitmap 1080 is 1, is read out from the main differential volume 1140 (Step 2670) to be written to the block to which the main volume 1120 corresponds (Step 2680).

The main DKC 1030 sets to zero the bit of the main differential bitmap 1080 corresponding to the block containing the written data (Step 2690), while it sets to 1 the corresponding bit of the main bitmap 1070 to return back to the processing in Step 2660 (Step 2695).

On the other hand, if it is determined in Step 2660 that all of the values of the main differential bitmap 1080 are zero, then the main DKC 1030 waits for the completion report from the sub-DKC 1040 (Step 2700). After having received the completion report transmitted from the sub-DKC 1040 (Step 2710), the main DKC 1030 turns OFF the main freezing mode 1060 which is stored in the RAM 1260 (Step 2720) to transmit a signal exhibiting the freezing processing completion report to the host computer 1010 to complete the main freezing processing 2600 (Step 2730).

Upon completion of the processing in Step 2650, the processing in Step 2700 may be executed, and the update processing for the main differential volume (Steps 2660 to 2695) may be executed after completion of the main freezing processing.

Figure 8:
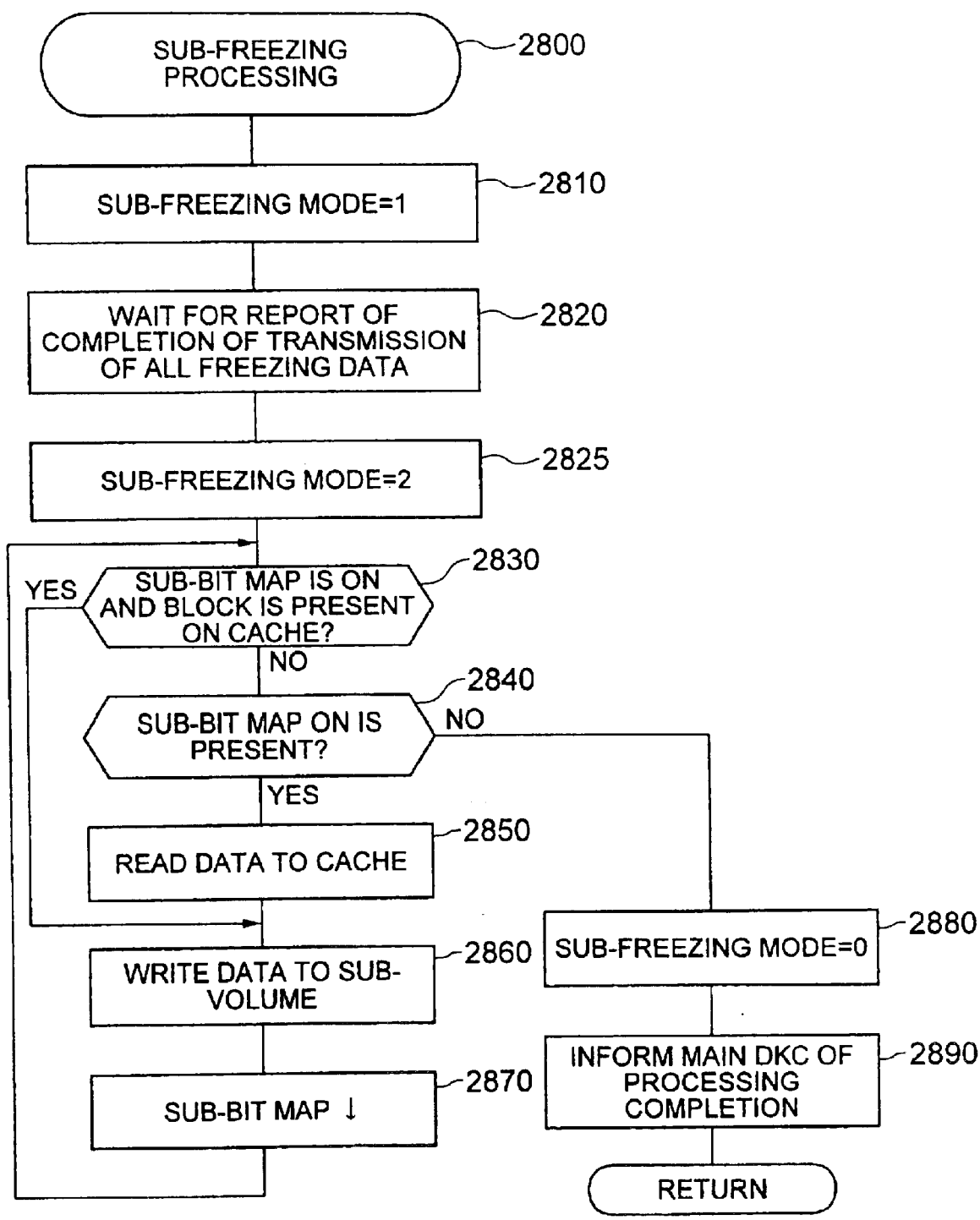
FIG. 8 is a flow chart useful in explaining the sub-freezing processing in the first embodiment.

FIG. 8 is a flow chart useful in explaining a sub-freezing processing 2800 which the sub-DKC 1040 executes at the time when the main DKC 1030 has issued the freeze instruction to the sub-DKC 1040.

After having received the freeze instruction command from the main DKC 1030, the sub-DKC 1040 sets to 1 the sub-freezing mode 1090 which is stored in the RAM 1260 (Step 2810) to wait for the report, exhibiting that all of the freezing data has already been transmitted, from the main DKC 1030 (Step 2820).

After having received the report exhibiting the completion of the transmission of all of the freezing data from the main DKC 1030, the sub-DKC 1040 sets to 2 the sub-freezing mode 1090 (Step 2825).

The sub-DKC 1040 judges whether or not the corresponding bit of the sub-bitmap 1100 stored in the RAM 1260 is 1 and also whether or not the corresponding block having the data is present on the RAM 1260 (Step 2830).

If it is determined in Step 2830 that the corresponding block is present on the RAM 1260, then the sub-DKC 1040 executes the processing in Step 2860. On the other hand, if it is determined in Step 2830 that the corresponding block is not present on the RAM 1260, then it is determined whether or not the block in which the corresponding bit of the sub-bitmap 1100 is 1 is present (Step 2840).

If it is determined in Step 2840 that the block in which the corresponding bit of the sub-bitmap 1100 is 1 is present, then the sub-DKC 1040 reads out the data corresponding to the bit as 1 from the sub-differential volume A 1170 to the RAM 1260 (Step 2850) to write the data of interest to the block of the sub-volume 1150 corresponding to the data read to the RAM 1260 (Step 2860).

The sub-DKC 1040 sets to zero the bit of the sub-bitmap 1100 corresponding to the data which has already been written (Step 2870) to return back to the processing in Step 2830.

On the other hand, if it is determined in Step 2840 that the block in which the corresponding bit of the sub-bitmap 1100 is 1 is absent, then the sub-DKC 1040 sets to zero the sub-freezing mode 1090 (Step 2880) to transmit the report exhibiting the completion of the sub-freezing processing to the main DKC 1030 (Step 2890) to complete the sub-freezing processing 2800.

Figure 9:
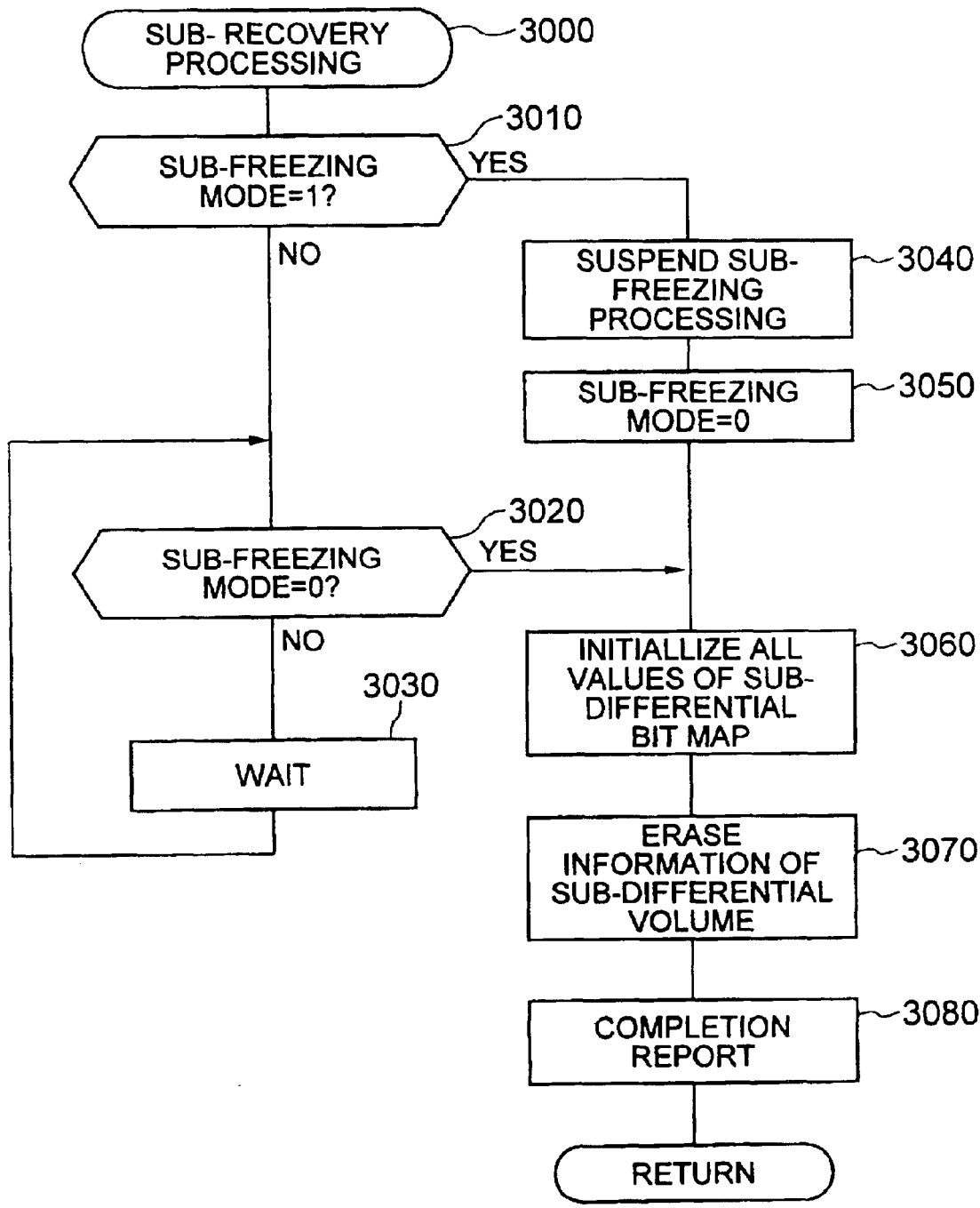
FIG. 9 is a flow chart useful in explaining the sub-recovery processing in the first embodiment.

FIG. 9 is a flow chart useful in explaining a sub-recovery processing 3000 which the sub-DKC 1040 executes in accordance with the instruction from the sub-host computer 1020 in the case where the host computer 1010 and the main storage apparatus 1180 become both unusable at all due to a disaster or the like.

After having received the instruction issued from the sub-host computer 1020, the sub-DKC 1040 judges whether or not the sub-freezing mode 1090 is 1 (Step 3010). If it is determined in Step 1040 that the sub-freezing mode 1090 is 1, then the sub-DKC 1040 suspends the sub-freezing processing 2800 which the sub-DKC 1040 itself is executing (Step 3040) to set to zero the sub-freezing mode (Step 3050).

The sub-DKC 1040 initializes all of the values of the sub-differential bitmap to zero (Step 3060) to erase the information which the sub-differential volume A 1170 and the sub-differential volume B 1175 have (Step 3070).

The sub-DKC 1040 transmits the completion report to the sub-host computer 1020 (Step 3080) to complete the sub-recovery processing 3000.

On the other hand, if it is determined in Step 3010 that the sub-freezing mode 1090 is not 1, then the sub-DKC 1040 judges whether or not the sub-freezing mode 1090 is zero (Step 3020). If it is determined in Step 3020 that the sub-freezing mode 1090 is zero, then the sub-DKC 1040 executes the processing in Step 3060. On the other hand, if it is determined in Step 3020 that the sub-freezing mode 1090 is not zero, then the sub-DKC 1040 waits for the sub-freezing mode 1090 to become zero to execute the processing in Step 3020 (Step 3030).

By executing the sub-recovery processing 3000, the volume image of the main volume 1120 at a time point when the freeze instruction was issued from the host computer 1010 to the main DKC 1030 last time or this time is copied to the sub-volume 1150. Then, the sub-host computer 1020 can use freely the copied volume image.

Figure 10:
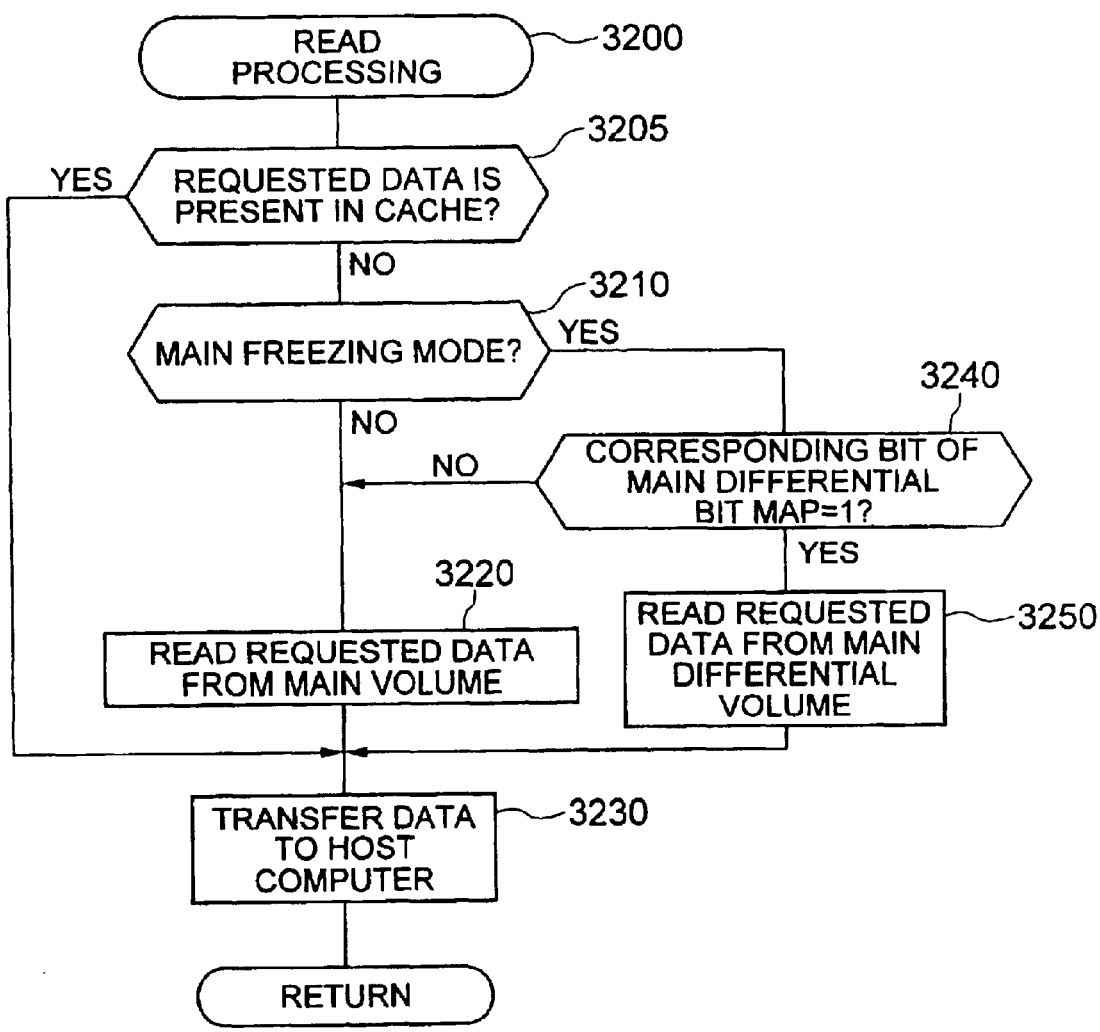
FIG. 10 is a flow chart useful in explaining the reading processing in the first embodiment.

FIG. 10 is a flow chart useful in explaining a read processing 3200 which the main DKC 1030 executes at the time when the host computer 1010 has issued the read command to read the data to the main storage apparatus system 1180.

After having received the read command issued from the host computer 1010, the main DKC 1030 judges whether or not the data which has been requested from the host computer 1010 is present in the RAM 1260 (Step 3205).

If it is determined in Step 3205 that the requested data is not present in the RAM 1260, then the main DKC 1030 checks the main freezing mode (Step 3210). If it is determined in Step 3210 that the main freezing mode 1060 is OFF, then the main DKC 1030 reads out the requested data from the main volume 1130 (Step 3220) to transfer the data of interest to the host computer 1010 to complete the read processing 3200 (Step 3230).

On the other hand, if it is determined in Step 3210 that the main freezing mode 1060 is ON, then the main DKC 1030 judges whether or not the bit of the main differential bitmap 1080 corresponding to the data requested from the host computer 1010 is 1 (Step 3240).

If it is determined in Step 3240 that the corresponding bit is zero, then the main DKC 1030 executes the processing in Step 3220. On the other hand, if it is determined in Step 3240 that the corresponding bit is 1, then the main DKC 1030 finds out the data, which has been required from the host computer 1010, from the main differential volume 1140 to read out the data thus found out to execute the processing in Step 3230 (Step 3250).

On the other hand, if it is determined in Step 3205 that the requested data is present in the RAM 1260, then the main DKC 1030 executes the processing in Step 3230.

Figure 11:
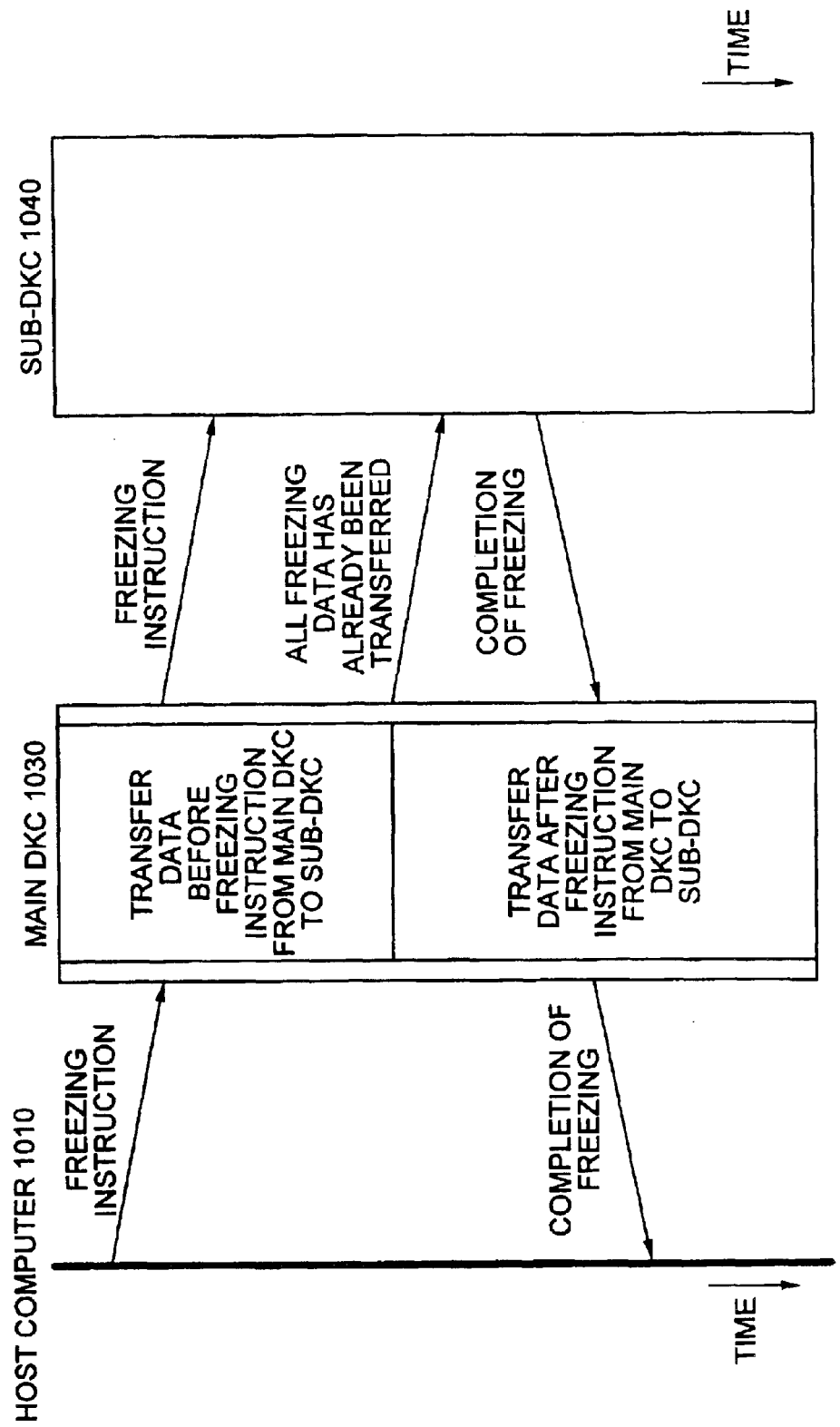
FIG. 11 is a schematic view useful in explaining the flow of the freeze instruction corresponding to the first embodiment.

FIG. 11 is a schematic view useful in explaining the transmission and the reception of the freeze instruction between the apparatuses included in the host computer 1000.

In FIG. 11, the vertical axis represents the time base. Thus, it is meant that the time elapses as the position on the drawing is located more downwardly.

The host computer 1010 issues the freeze instruction to the main DKC 1030, and then in response to the freeze instruction issued thereto, the main DKC 1030 issues the freeze instruction to the sub-DKC 1040.

After having transferred the volume image of the main volume 1120 at a time point of the reception of the freeze instruction to the sub-DKC 1040, the main DKC 1030 transmits the report showing the completion of the transfer of all of the freezing data to the sub-DKC 1040.

The sub-DKC 1040 reflects the data of the main volume 1120 at a time point of the issue of the freeze instruction to the sub-volume 1150, and after completion of the reflection of the data, informs the main DKC 1030 of the completion of the freezing. In response thereto, the main DKC 1030 informs the host computer 1010 of the completion of the freezing.

By adopting the configuration of the present embodiment, the data which is held in the main disk unit at a time point when the freeze instruction is issued from the host computer 1010 can be held in the sub-disk unit, and hence even when the data is destroyed, the loss of the data can be suppressed to a minimum.

In other words, the sub-storage apparatus system 1190 holds the data at a time point of the issue of the freeze instruction and at the same time, holds as the differential data the data which was written on and after that time point. This freezing is carried out at periodic intervals, whereby when the data of the main storage apparatus system 1180 is not able to be used due to for some cause or other, all of the data at a time point when it was frozen last time can be obtained from the sub-storage apparatus system 1190.

In this connection, while in the present embodiment, the description has been given on the assumption that a plurality of volumes are present inside of the main disk unit 1130, the present invention is not intended to be limited thereto. That is, a plurality of disk units may be present in the main storage apparatus system 1180, and each of the disk units may take the function of the volume on itself. This is also applied to the sub-disk unit 1160.

Figure 12:
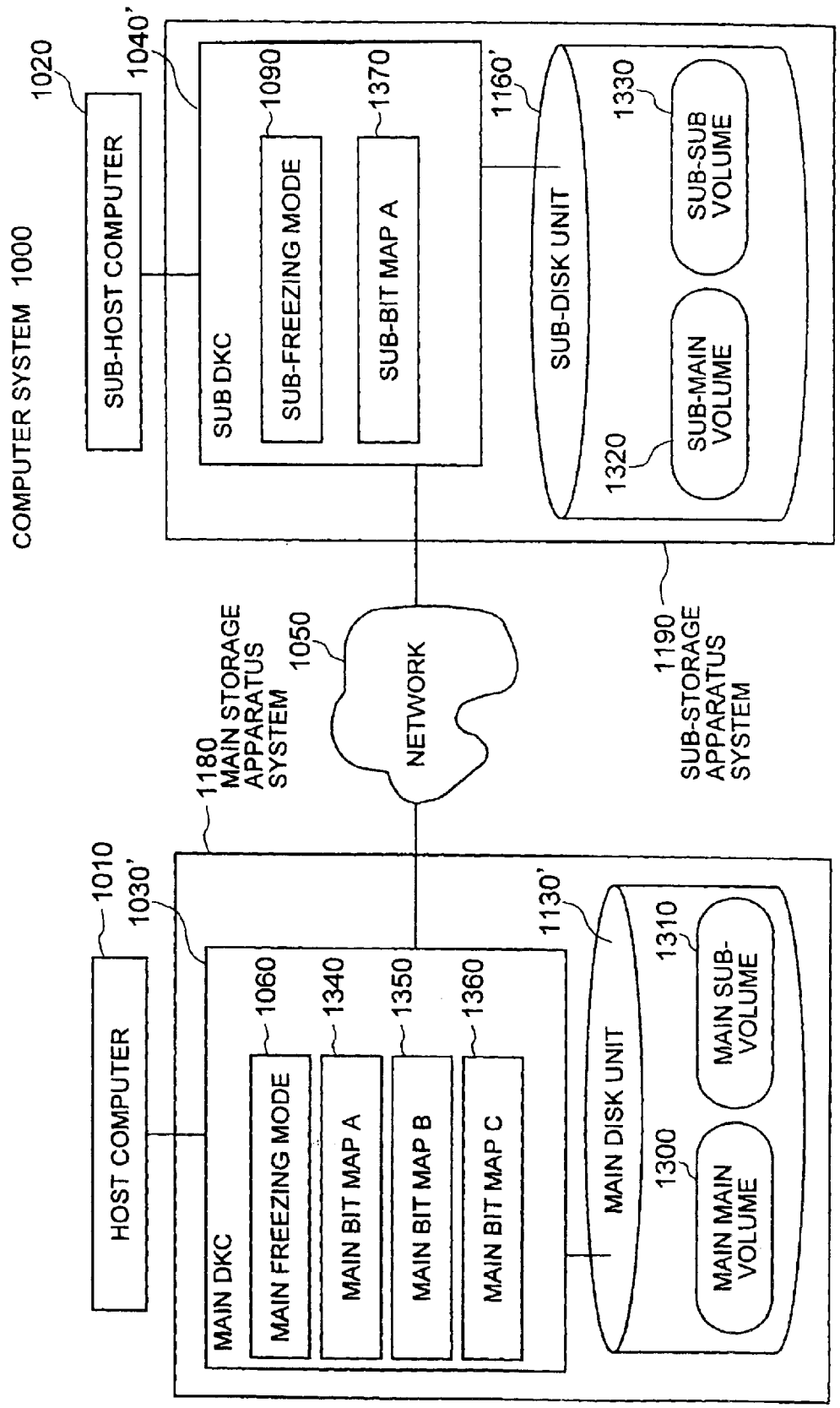
FIG. 12 is a block diagram showing a configuration of a computer system to which a second embodiment of the present invention is applied.

FIG. 12 is a block diagram showing a configuration of a second embodiment of the computer system 1000 to which the present invention is applied.

A point of difference of the present embodiment from the first embodiment is that the copy of the coherent volume image at the time when the freeze instruction has been issued from the host computer 1010 is generated in the main disk unit 1130 once, and the data is transferred from the volume thus generated to the sub-DKC.

The present embodiment is also different from the first embodiment in that two volumes are prepared for the sub-storage apparatus system, and one of them is made the volume which is used in order to generate the coherent volume.

The description will hereinafter be given with respect to points of difference from the computer system 1000 of the first embodiment. The parts which will not be described here have the same configurations as those of the first embodiment, and hence are designated with the same reference numerals.

A main disk unit 1130' includes a main main-volume 1300 and a main sub-volume 1310.

In the main main-volume 1300, there is stored the data which has been transferred from the host computer 1010. The main sub-volume 1310 is used when copying the volume image of the main main-volume 1300 at a time point when the freeze instruction was issued. The blocks which the main main-volume 1300 and the main sub-volume 1310 have, respectively, show one-to-one correspondence.

The main DKC 1030' has a main bitmap A 1340, a main bitmap B 1350, and a main bitmap C 1360 all of which are contained in the RAM 1260.

The main bitmap A 1340, when the contained bit is 1, with respect to the block corresponding to that bit, shows that the contents of the data which is stored in the main main-volume 1300 are different from those of the data which is stored in the main sub-volume 1310.

While the main bitmap B 1350 also shows the difference between the main main-volume 1300 and the main sub-volume 1310, only the bit corresponding to the block in which after the freeze instruction has been transmitted from the host computer 1010, the data is written to the main main-volume 1300 becomes 1.

The main bitmap C 1360 shows that there is the difference in the contents between the main sub-volume 1310 and a sub-main-volume 1320.

A sub-disk unit 1160' includes the sub-main-volume 1320 and a sub-sub-volume 1330.

To the sub-main-volume 1320, there is written the data which has been transferred from the main DKC 1030'. In the sub-sub-volume 1330, there is built the volume image of the main main-volume 1300 at a time point when the freezing processing was executed last time.

A sub-DKC 1040' has a sub-bitmap A 1370 showing the difference between the sub-main-volume 1320 and the sub-sub-volume 1330. Then, the sub-bitmap A 1370 is contained in the RAM 1260. In the present embodiment, the sub-freezing mode 1090 is not used.

FIGS. 13A to 13D are respectively schematic views showing the flow of the data corresponding to the present embodiment.

Figure 13A:
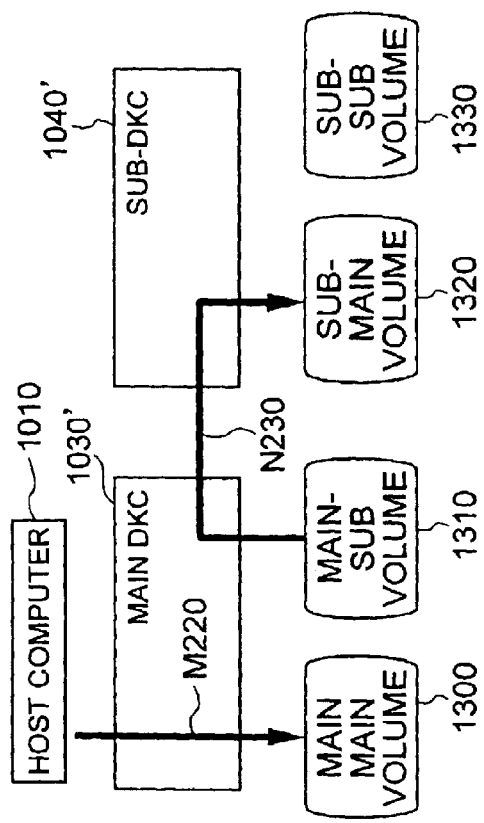
FIGS. 13A to 13D are respectively schematic views useful in explaining the flow of the data in the second embodiment.

In FIG. 13A, there is shown the flow of the data in the case where the host computer 1010 does not issue the freeze instruction.

The data which has been transferred from the host computer 1010 is written to the main main-volume 1300 (indicated by an arrow J 190).

Then, it is assumed that in the sub-sub-volume 1330, there is stored the data of the volume image of the main main-volume 1300 at a time point when the host computer 1010 issued the freeze instruction last time.

Figure 13C:
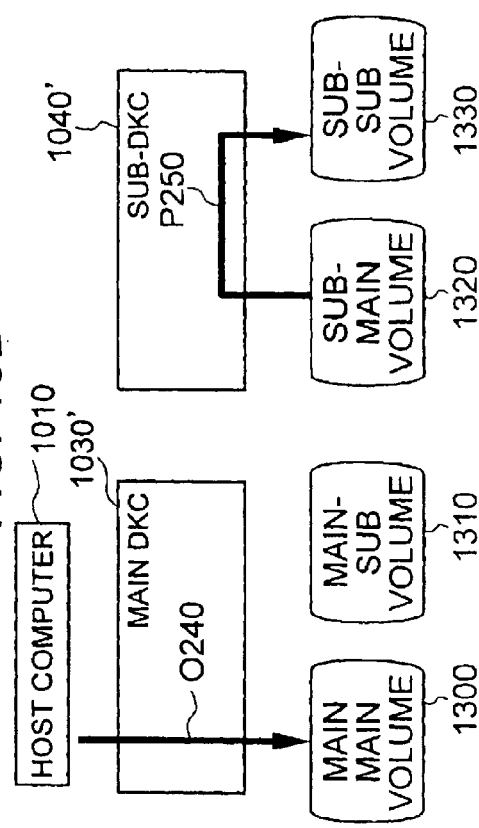
Figure 13B:
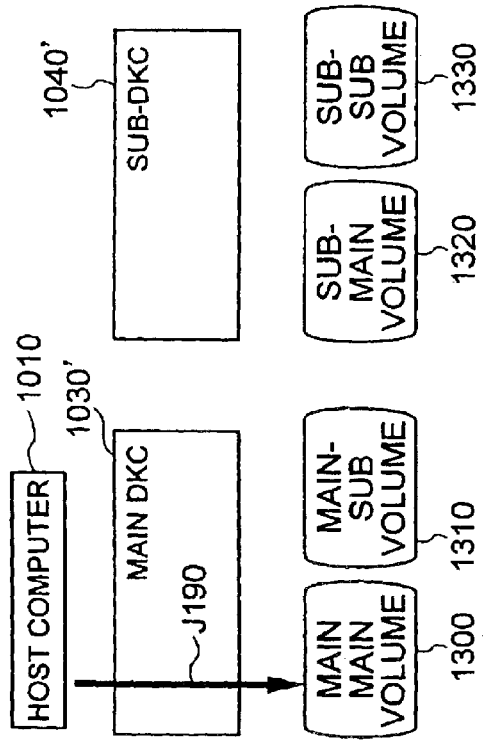

In FIG. 13B, there is shown the flow of the data for a time period ranging from a time point when a host computer 1010 has issued the freeze instruction up to a time point when the main storage apparatus system 1180 generates, in the main sub-volume 1310, the copy of the volume image of the main main-volume 1300 at a time point when the main storage apparatus system 1180 issued the freeze instruction.

The main disk unit 1130 copies the data from the main main-volume 1300 to the main sub-volume 1310 (indicated by an arrow L 210).

While the data which the main DKC 1030' has received is written to the main main-volume 1300 (indicated by an arrow K 200), in the case of writing of the data to the block in which the copy to the main sub-volume 1310 is not yet carried out, after completion of the processing of copying the data indicated by the arrow L 210, the data is written to the main main-volume 1300.

In FIG. 13C, there is shown the flow of the data for a time period ranging from a time point when the volume image of the main main-volume 1300 at a point when the host computer 1010 issued the freeze instruction has been generated in the main sub-volume 1310 up to a time point when the volume image generated in the main sub-volume 1310 is generated in the sub-main-volume 1320 which the sub-DKC 1040' manages.

The data which has been transferred from the host computer 1010 is written to the main main-volume 1300 (indicated by the arrow M 220). The data of the main sub-volume 1310 is read out to the main DKC 1030' to be transferred to the sub-DKC 1040' to be written to the sub-main-volume 1320 (indicated by the arrow N 230).

Figure 13D:
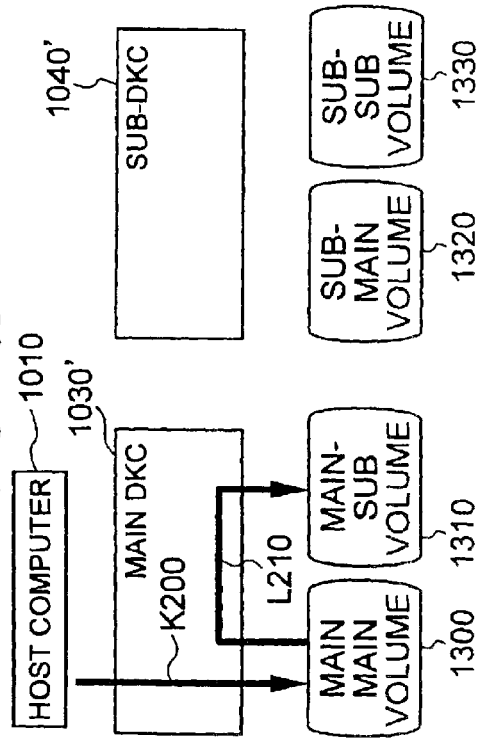

In FIG. 13D, there is shown the flow of the data for a time period ranging from a time point when the volume image of the main main-volume 1300 at a time point when the host computer 1010 issued the freeze instruction to the sub-main-volume 1320 has been generated up to a time point when the volume image thus generated is copied to the sub-sub-volume 1330.

The data which has been transferred from the host computer 1010 is written to the main main-volume 1300 (indicated by an arrow O 240).

The sub-DKC 1040' controls the copy of the data from the sub-main-volume 1320 to the sub-sub-volume 1330 (indicated by an arrow P 250).

In the present embodiment, the copy of the data for duplicating the volume image of the main main-volume 1300 is carried out in such a way that of the data which is stored in the source volume and in the destination volume, only the differential data is subjected to the differential copy.

In FIGS. 13A, 13B and 13C, the sub-sub-volume 1330 holds the volume image of the main main-volume 1300 at a time point when the host computer 1010 issued the freeze instruction last time.

In FIG. 13D, the sub-main-volume 1320 holds the volume image of the main main-volume 1300 at a time point when the host computer 1010 has issued the freeze instruction this time.

Therefore, volume image of the main main-volume 1300 at a time point when the host computer 1010 issued the freeze instruction will be held in any case.

Figure 14:
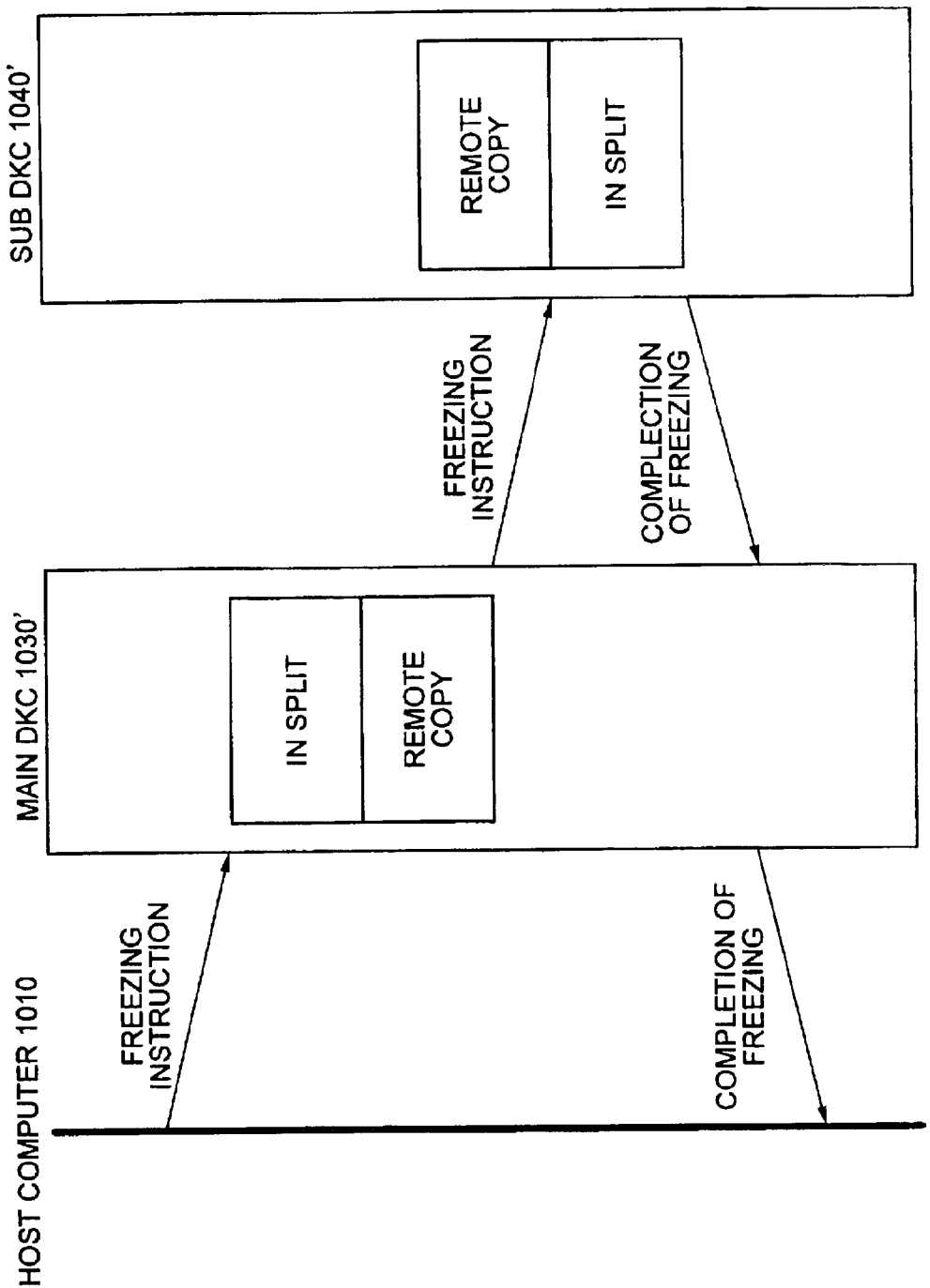
FIG. 14 is a schematic view useful in explaining the flow of a freeze instruction in the second embodiment.

FIG. 14 is a schematic view useful in explaining the flow of the freeze instruction in the computer system 1000 of the present embodiment. In the figure, the vertical direction represents the time base. Thus, it is meant that the time elapses as the position on the drawing is located more downwardly.

The host computer 1010 issues the freeze instruction to the main DKC 1030'. In response to the freeze instruction issued thereto, the main DKC 1030' differential-copies (hereinafter, the differential copy will be referred to as "the split", when applicable) all of the data, which is stored in the main main-volume 1300 at a time point when the freeze instruction was issued, to the main sub-volume 1310. After completion of the differential copy, the main DKC 1030' reads out the data of the main sub-volume 1310 to transmit the data thus read out to the sub-DKC 1040'. Then, the sub-DKC 1040' writes the data which has been received from the main DKC 1030' to the sub-main volume 1320.

The main DKC 1030' issues the freeze instruction to the sub-DKC 1040'. After having received the freeze instruction, the sub-DKC 1040' splits the volume image of the sub-main volume 1320 to the sub-sub-volume 1330. After completion of the split, the sub-DKC 1040' transmits the report exhibiting the completion of the freezing to the main DKC 1030'. After having received this report, the main DKC 1030' informs the host computer 1010 of the completion of the freezing.

Figure 15:
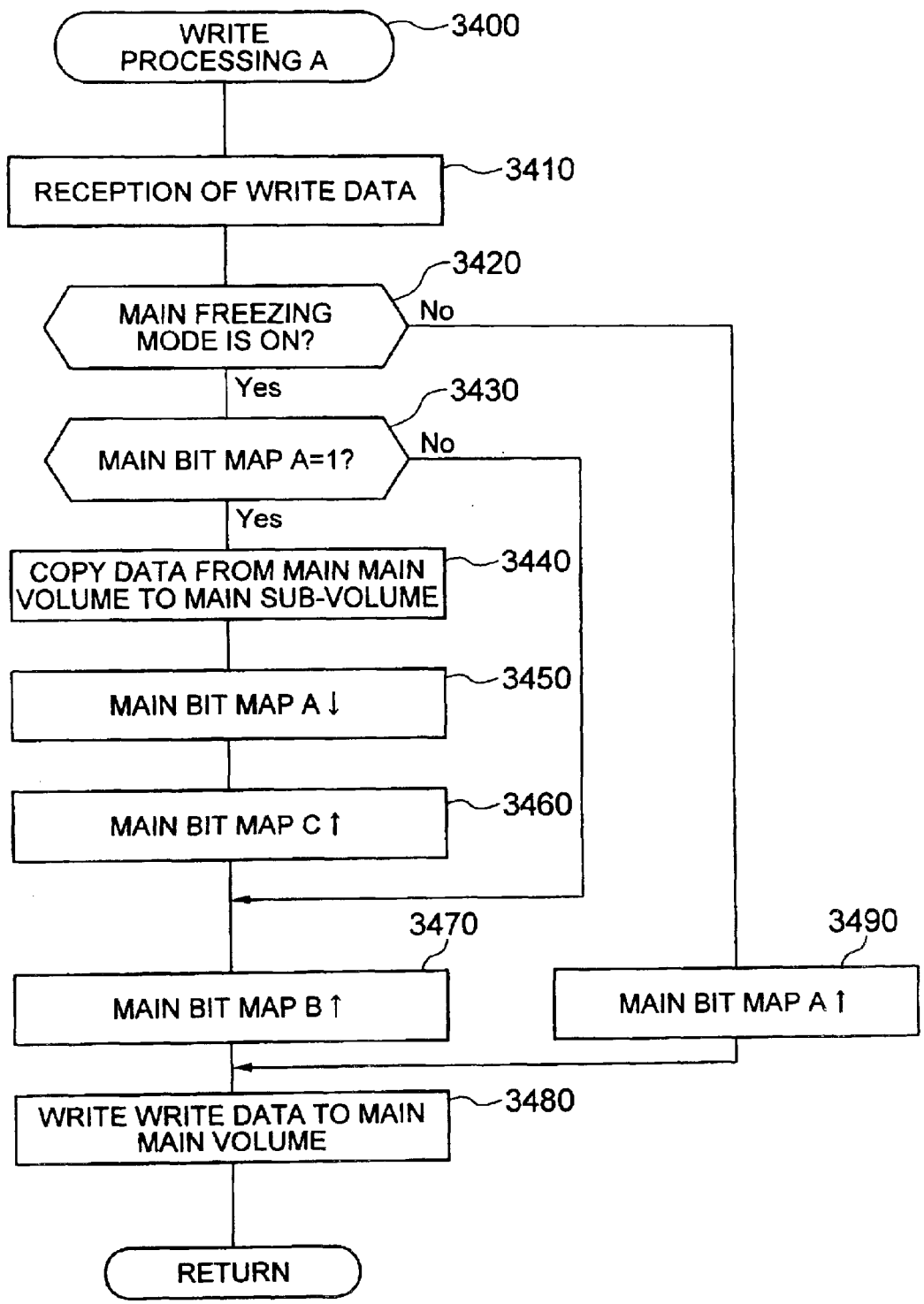
FIG. 15 is a flow chart useful in explaining the write processing A in the second embodiment.

FIG. 15 is a flow chart useful in explaining a write processing A 3400 which the main DKC 1030' executes when the host computer 1010 transmits the data to the main storage apparatus system 1180.

The main DKC 1030' receives the write data from the host computer 1010 (Step 3410) to judge whether or not the main freezing mode 1060 is in the ON state (Step 3420).

If it is determined in Step 3420 that the main freezing mode 1060 is in the ON state, then the main DKC 1030' judges whether or not the bit of the main bitmap A 1340 corresponding to the block in which the transferred data is stored is 1 (Step 3430).

If it is determined in Step 3420 that the bit of the main bitmap A 1340 is zero, then the main DKC 1030' executes the processing in Step 3470. On the other hand, if it is determined in Step 3420 that the bit of the main bitmap A 1340 is 1, then the main DKC 1030' controls the main disk unit 1130 in such a way as to copy the data stored in the block corresponding to the bit of 1 from the main main volume 1300 to the main sub-volume 1310 (Step 3440).

After completion of the copy, the main DKC 1030' sets to zero the corresponding bit of the main bitmap A 1340 (Step 3450) and also sets to 1 the corresponding bit of the main bitmap C 1360 (Step 3460).

The main DKC 1030' sets to 1 the bit of the main bitmap B 1350 corresponding to the block in which the transferred data is stored (Step 3470) to write the write data to the corresponding block of the main main-volume 1300 to complete the write processing A 3400 (Step 3480).

On the other hand, if it is determined in Step 3420 that the main freezing mode is in the OFF state, then the main DKC 1030' sets to 1 the corresponding bit of the main bitmap A to execute the processing in Step 3480 (Step 3490).

Figure 16:
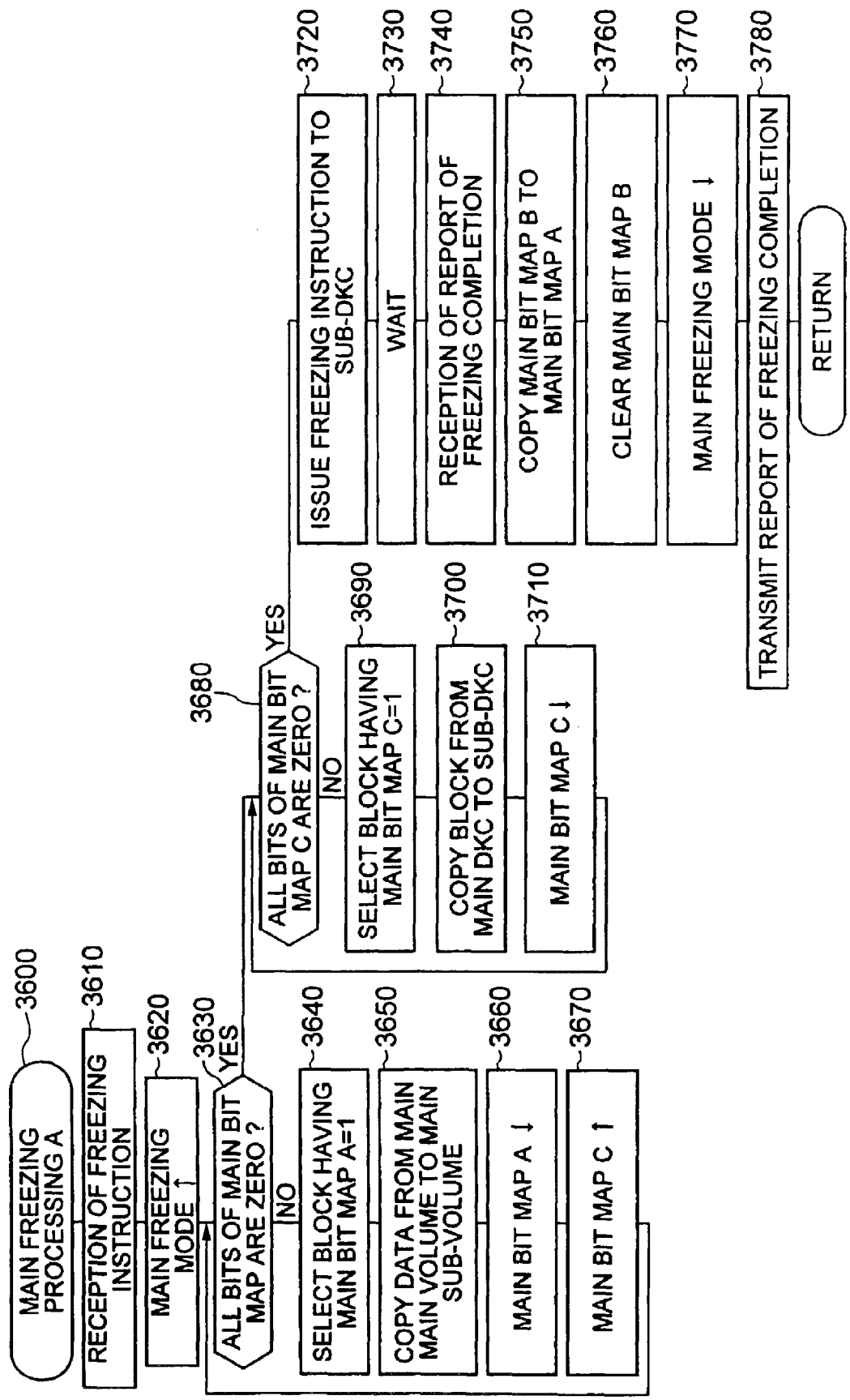
FIG. 16 is a flow chart useful in explaining the main freezing processing A in the second embodiment.

FIG. 16 is a flow chart useful in explaining the main freezing processing A 3600 which the main DKC 1030' executes when the host computer 1010 has issued the freeze instruction to the main DKC 1030'.

After having received the freeze instruction from the host computer 1010 (Step 3610), the main DKC 1030' makes the ON state the main freezing mode (Step 3620) to judge whether or not all of the bits of the main bitmap A 11340 is zero (Step 3630).

If it is determined in Step 3630 that all of the bits of the main bitmap A 1340 are not zero, then the main DKC 1030' specifies the block in which the bit is 1 in the main bitmap A 1340 (Step 3640). Then, the main DKC 1030' reads out the specified block of the main main volume 1300 to control the main disk 1130' in such a way as to copy the block thus read out to the main sub-volume 1310 (Step 3650).

After completion of the copy of the specified block, the main DKC 1030' sets to zero the corresponding bit of the main bitmap A 1340 (Step 3660), while sets to 1 the corresponding bit of the main bitmap C 1360 to return back to the processing in Step 3630 (Step 3670).

If it is determined in Step 3630 that all of the bits of the main bitmap A 1340 are zero, then the main DKC 1030' judges whether or not all of the bits of the bitmap C 1360 are zero (Step 3680).

If it is determined in Step 3680 that all of the bits of the main bitmap C1360 are not zero, then the main DKC 1030' selects the bit as 1 of the main bitmap C 1360 (Step 3690) to read out the block corresponding to the bit of the main sub-volume 1310 to transmit the block thus read out to the sub-DKC 1040' (Step 3700).

The main DKC 1030' sets to zero the corresponding bit of the main bitmap C 1360 to return back to the processing in Step 3680 (Step 3710).

On the other hand, if it is determined in Step 3680 that all of the bits of the main bitmap C 1360 are zero, then the main DKC 1030' issues the freeze instruction to the sub-DKC 1040' (Step 3720) to wait for the report exhibiting the freezing completion to be transmitted thereto from the sub-DKC 1040' (Step 3730).

After having received the report exhibiting the completion of the freezing from the sub-DKC 1040' (Step 3740), the main DKC 1030' copies the contents of the main bitmap B 1350 to the main bitmap A 1340 (Step 3750) to set to zero all of the bits of the main bitmap B 1350 (Step 3760). The main DKC 1030' makes the OFF state the main freezing mode 1060 (Step 3770) to transmit the report exhibiting the freezing completion to the host computer 1010 to complete the main freezing processing A 3600 (Step 3780).

Figure 17:
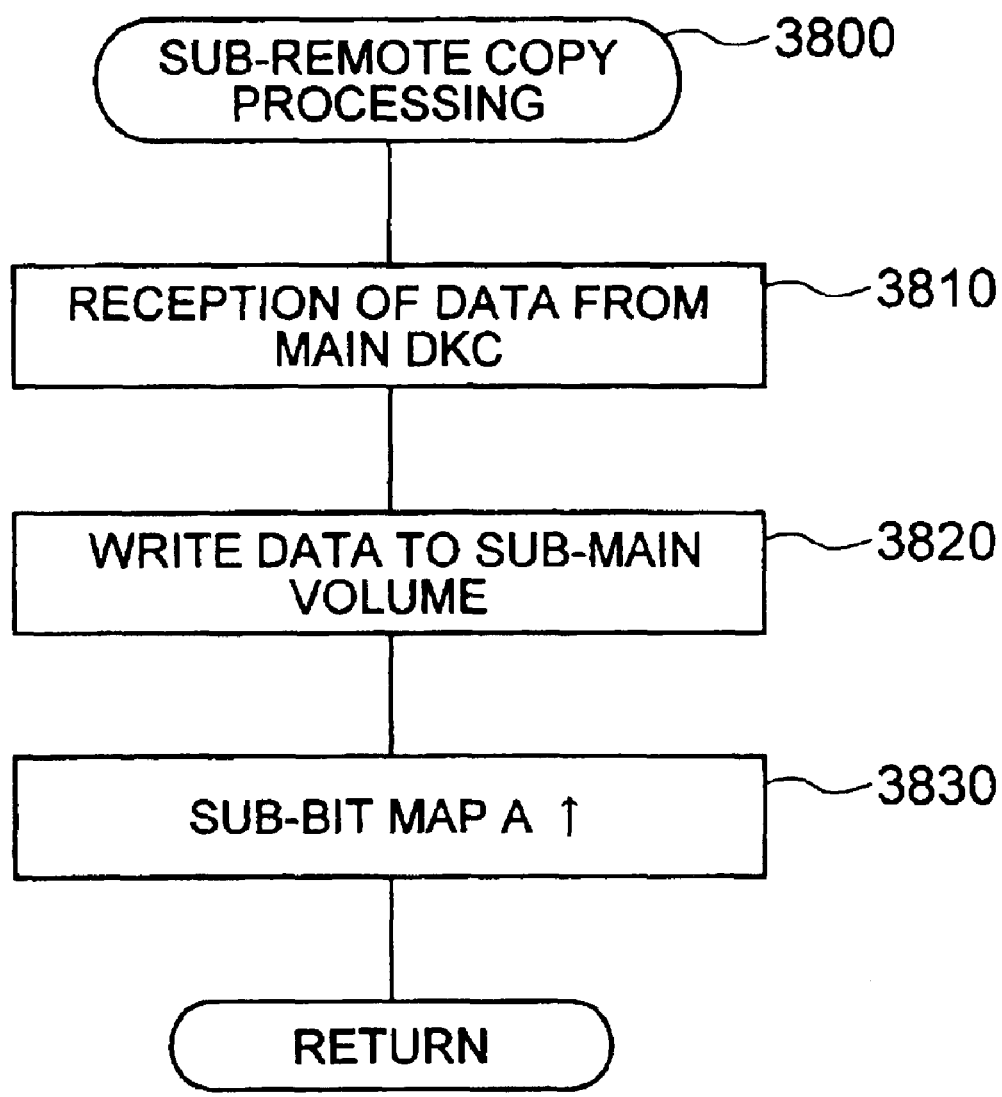
FIG. 17 is a flow chart useful in explaining the sub-remote copy processing A in the second embodiment.

FIG. 17 is a flow chart useful in explaining the sub-remote copy processing A 3800 which the sub-DKC 1040 executes when the processing of the remote copy is executed for the sub-DKC 1040 in Step 3700 of the main freezing processing A 3600.

After having received the data from the main DKC 1030' (Step 3810), the sub-DKC 1040 controls the sub-disk unit 1160 in such a way that the received data is written to the corresponding block of the sub-main-volume 1320 (Step 3820).

After the processing of writing the data has been completed, the sub-DKC 1040 sets to 1 the corresponding bit of the sub-bitmap A 1370 to complete the sub-remote copy processing A 3800 (Step 3830).

Figure 18:
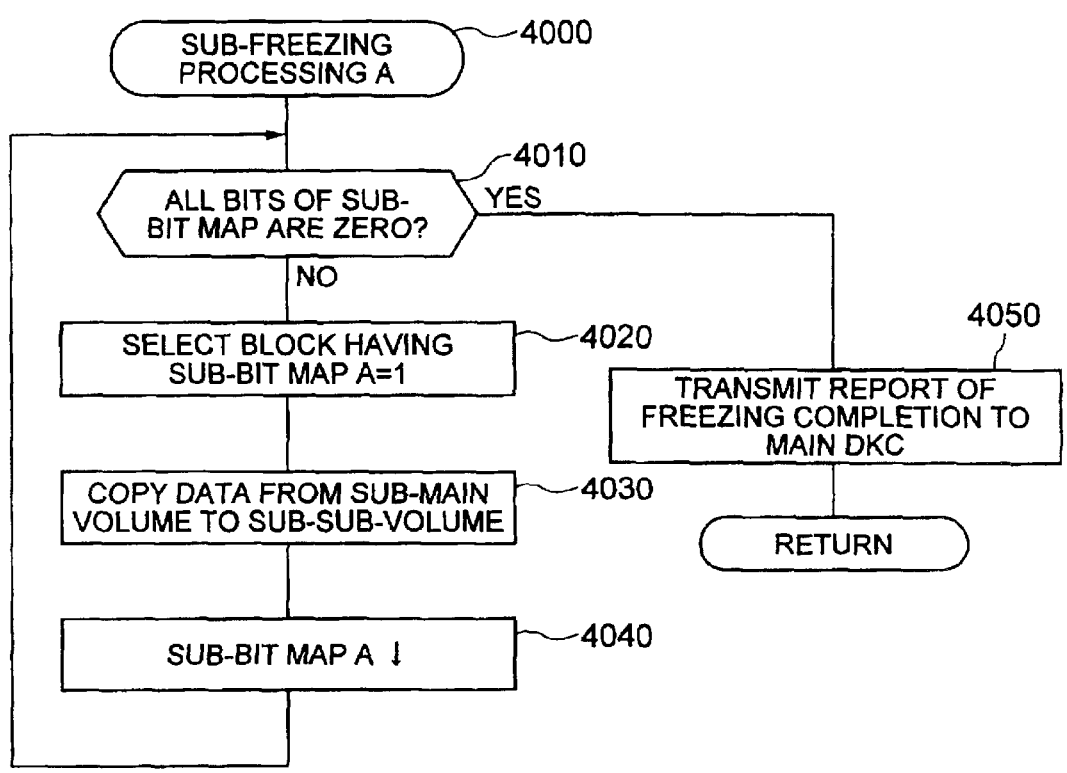
FIG. 18 is a flow chart useful in explaining the sub-freezing processing A in the second embodiment.

FIG. 18 is a flow chart useful in explaining a sub-freezing processing A 4000 which the sub-DKC 1040' executes when the main DKC 1030' has issued the freeze instruction to the sub-DKC 1040'.

The sub-DKC 1040' which has received the freeze instruction from the main DKC 1030' judges whether or not all of the bits of the sub-bitmap A 1370 are zero (Step 4010).

If it is determined in Step 4010 that all of the bits of the sub-bitmap A 1370 are not zero, then the sub-DKC 1040' controls the sub-disk unit 1160' in such a way that it selects the block of the sub-main-volume 1320 corresponding to the bit as 1 of the sub-bitmap A 1370 (Step 4020) to read out the block thus selected to copy the block thus read out to the corresponding block of the sub-sub-volume 1330 (Step 4030).

After completion of the copy of the corresponding block, the sub-DKC 1040' sets to zero the corresponding bit of the sub-bitmap A 1370 to return back to the processing in Step 4010 (Step 4040).

On the other hand, if it is determined in Step 4010 that all of the bits of the sub-bitmap A 1370 are zero, then the sub-DKC 1040' transmits the report exhibiting the completion of the freezing to the main DKC 1030' to complete the sub-freezing processing A 4000 (Step 4050).

In the present embodiment, since the data of the volume image of the main main-volume 1300 at a time point when the host computer 1010 issued the freeze instruction last time is stored in either the sub-sub-volume 1330 or the sub-main-volume 1320, the processing corresponding to the sub-recovery processing 3000 become unnecessary.

When the read request has been made from the host computer 1010, the processing(s) as in the first embodiment does(do) not need to be executed, and the data of the main main-volume 1300 has only to be transferred.

Figure 19:
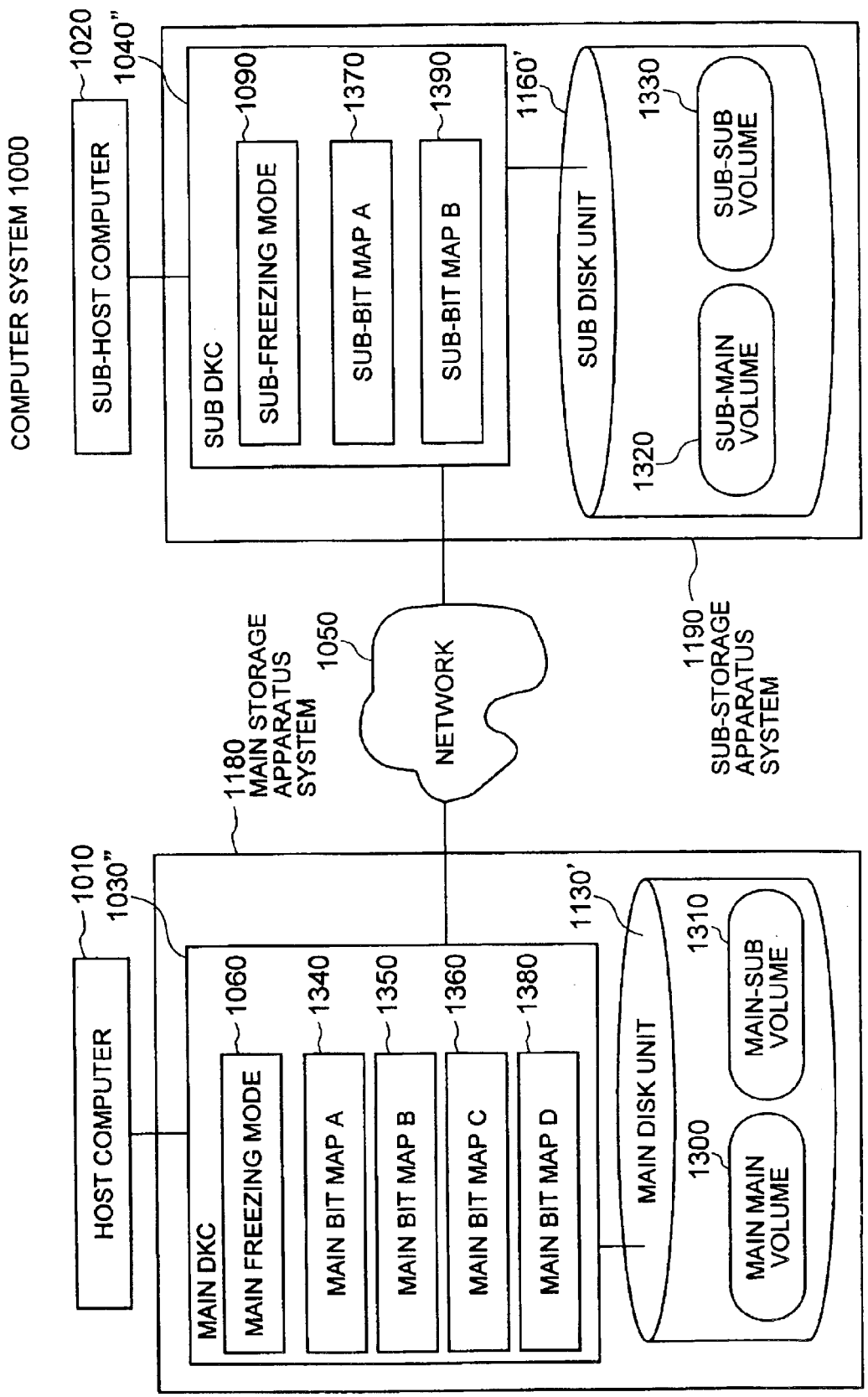
FIG. 19 is a block diagram showing a configuration of a computer system to which a third embodiment of the present invention is applied.

FIG. 19 is a block diagram showing a configuration of a third embodiment of the computer system 1000 to which the present invention is applied.

In the present embodiment, a point that the remote copy is carried out only in FIG. 13C of FIGS. 13A to 13D and hence the network can not be used effectively in the second embodiment is improved.

The description will hereinafter be given with respect to only a point of difference from the second embodiment.

A main DKC 1030" has a main bitmap D 1380 which the RAM 1260 includes.

The main bitmap D 1380 shows the data which is not yet copied to the main sub-volume 1310 and which is stored in the main main-volume 1300, i.e., the block containing that data which was remote-copied to the sub-main-volume 1320 before issue of the freeze instruction. 2201 A sub-DKC 1040" has a sub-bitmap B 1390.

The sub-bitmap B 1390 shows the block which is remote-copied from a main DKC 1030" to the sub-main volume 1320 on and after the freeze instruction has been issued this time but before the freeze instruction will be issued next time.

In the present embodiment, the main freezing mode takes the integral number from 0 to 3. The sub-freezing mode shows either ON or OFF.

FIGS. 20A to 20D are respectively schematic views showing the flow of the data in the computer system 1000 of the present embodiment.

The description will hereinafter be given with respect to the present embodiment while comparing the present embodiment with FIGS. 13A to 13D showing the flow of the data in the computer system 1000 to which the second embodiment is applied.

Figure 20A:
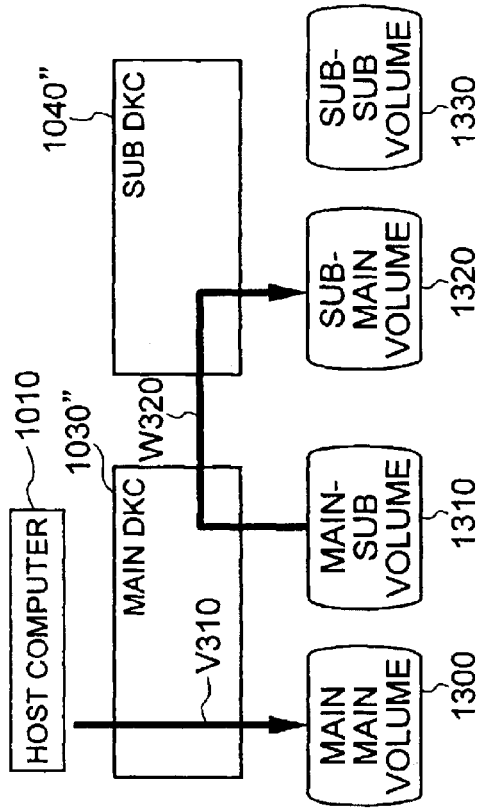
FIGS. 20A to 20D are respectively schematic views useful in explaining the flow of the data in the third embodiment.

In FIG. 20A, the data which has been written from the host computer 1010 to the main main-volume 1300 is transferred to the sub-DKC 1040" before the host computer 1010 issues the freeze instruction (indicated by an arrow R 270). An arrow Q 260 corresponds to the arrow J 190 shown in FIG. 13A.

Figure 20C:
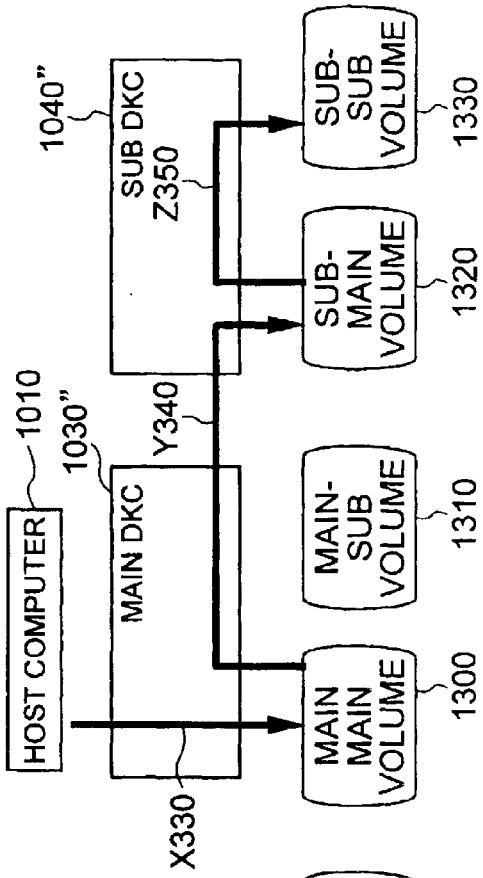
Figure 20B:
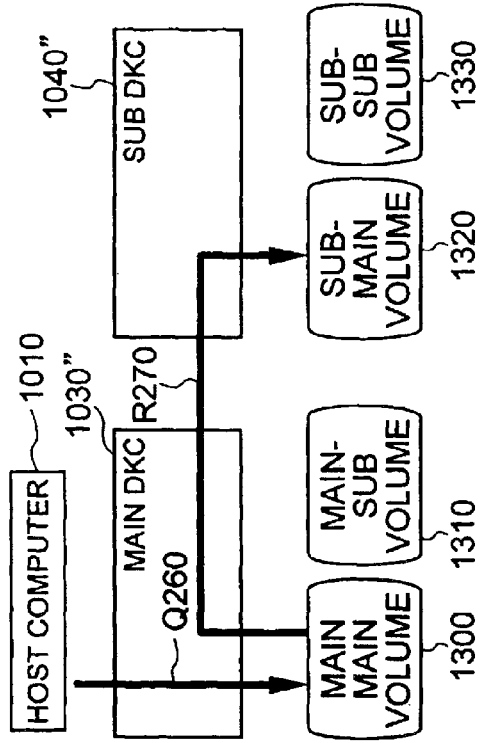

An arrow S 280 and an arrow T 290 in FIG. 20B show the flow of the data corresponding to the arrow K 200 and the arrow L 210 in FIG. 13B, respectively.

The data which has already been copied (indicated by the arrow T 290) to the main sub-volume 1310 but which is not yet sent to the sub-main-volume 1320 is transferred from the corresponding block of the main sub-volume 1310 to the sub-DKC 1040" through the main DKC 1030" to be written to the sub-main-volume 1320 (indicated by an arrow K 300).

An arrow V 310 and an arrow W 320 shown in FIG. 20C correspond to the arrow M 220 and the arrow N 230 shown in FIG. 13C, respectively.

Figure 20D:
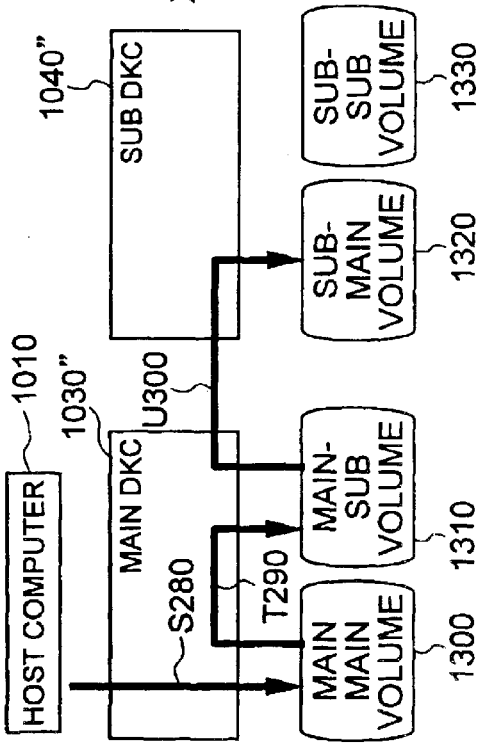

An arrow X 330 and an arrow Z 350 shown in FIG. 20D correspond to the arrow O and the arrow P shown in FIG. 13, respectively.

The data which has been newly written to the main main-volume 1300 (indicated by the arrow X 330) is copied to the sub-main-volume 1320 (indicated by an arrow Y 340) before the host computer 1010 issues the next freeze instruction.

In the case where the data for the block which is not yet copied from the sub-main-volume 1320 to the sub-sub-volume 1300 has been received from the main DKC 1030" by the sub-DKC 1040", the sub-DKC 1040" copies the data in the block corresponding to the data which has been received once from the sub-main-volume 1320 to the sub-sub-volume 1330 (indicated by the arrow Z 350). Thereafter, the sub-DKC 1040" controls the sub-disk unit 1160' in such a way that the data is written to the corresponding block of the sub-main-volume 1320.

FIG. 21 is a schematic view useful in explaining the flow of the freeze instruction in the computer system 1000 to which the present embodiment is applied. In the figure, the vertical direction represents the time base, and hence the time elapses as the position on the drawing is located more downwardly.

Comparing FIG. 21 with FIG. 14, it is understood that a point of difference is that the remote copy is carried out for a longer time period.

Figure 22:
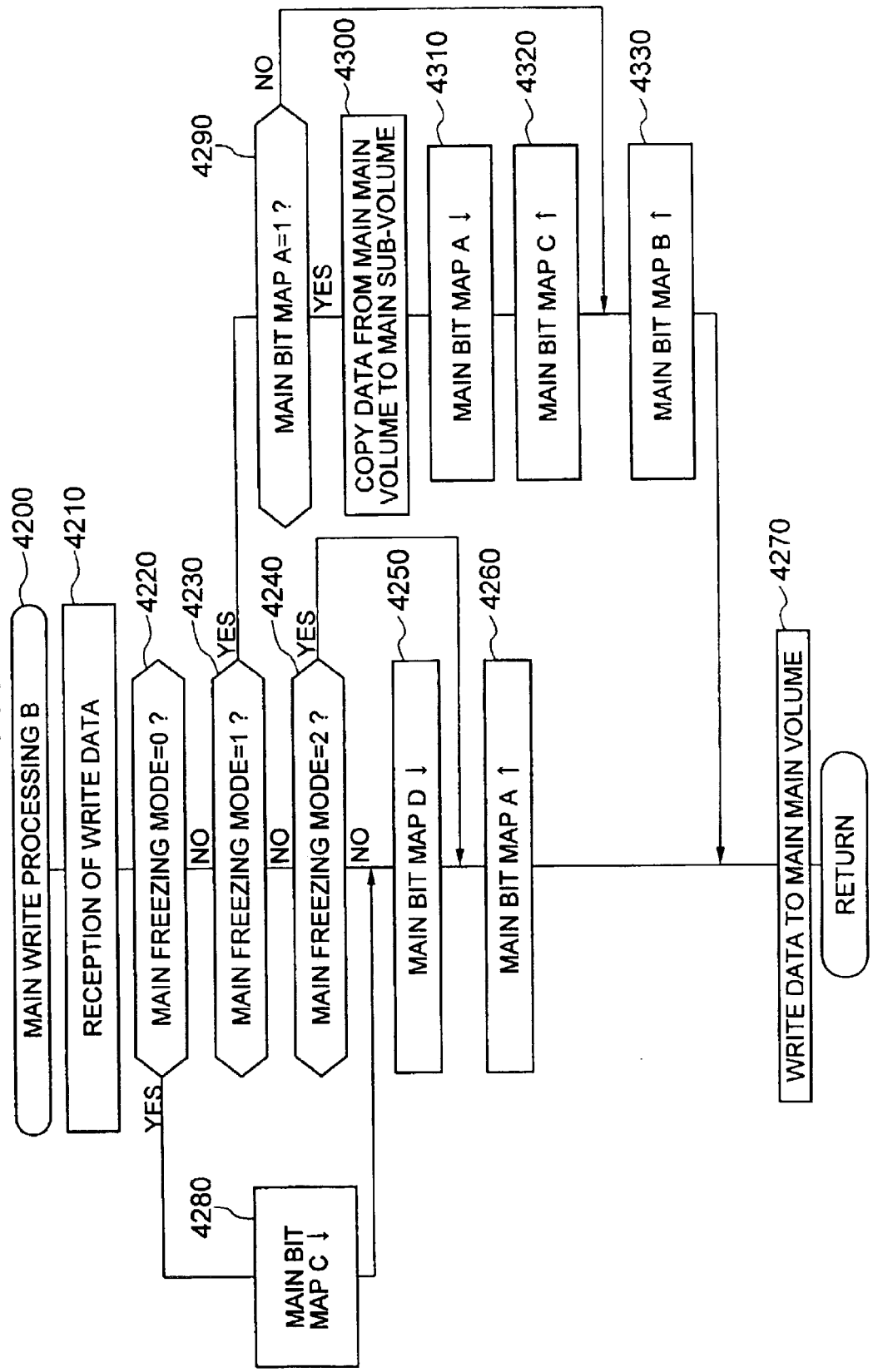
FIG. 22 is a flow chart useful in explaining the main write processing B in the third embodiment.

FIG. 22 is a flow chart useful in explaining a write processing B 4200 which the main DKC 1030" executes when the data has been transferred from the host computer 1010 to the main storage apparatus system 1180.

The main DKC 1030" receives the write data from the host computer 1010 (Step 4210) to judge whether or not the main freezing mode 1060 is zero (Step 4220). If it is determined in Step 4220 that the main freezing mode 1060 is not zero, then the main DKC 1030" judges whether or not the main freezing mode 1060 is 1 (Step 4230).

If it is determined in Step 4230 that the main freezing mode 1060 is not 1, then the main DKC 1030" judges whether or not the main freezing mode 1060 is 2 (Step 4240).

If it is determined in Step 4240 that the main freezing mode 1060 is 2, then the main DKC 1030" executes the processing in Step 4260. On the other hand, if it is determined in Step 4240 that the freezing mode 1060 is not 2 (i.e., it is determined to be 3), then the main DKC 1030" sets to zero the bit of the main bitmap D 1380 corresponding to the transferred block (Step 4250).

The main DKC 1030" sets to 1 the bit corresponding to the write data of the main bitmap A 1340 (Step 4260) and controls the main disk unit 1130" in such a way that the write data is stored in the corresponding block of the main main-volume 1300 to complete the main write processing B 4200 (Step 4270).

On the other hand, if it is determined in Step 4220 that the main freezing mode 1060 is zero, then the main DKC 1030" sets to zero the corresponding bit of the main bitmap C 1380 to execute the processing in Step 4250 (Step 4280).

In addition, if it is determined in Step 4230 that the main freezing mode 1060 is 1, then the main DKC 1030" judges whether or not the corresponding bit of the main bitmap A 1340 is 1 (Step 4290). If it is determined in Step 4290 that the corresponding bit is zero, then the main DKC 1030" executes the processing in Step 4330. On the other hand, if it is determined in Step 4290 that the corresponding bit is 1, then the main DKC 1030" controls the main disk unit 1160' in such a way that the data of the block of the main main-volume 1300 corresponding to the bit of interest is copied to the corresponding block of the main sub-volume 1310 (Step 4300).

The main DKC 1030" sets to zero the bit of the main bitmap A 1340 corresponding to the copied data (Step 4310). The main DKC 1030" sets to 1 the bit of the main bitmap C 1360 corresponding to the copied data (Step 4320). In addition, the main DKC 1030" sets to 1 the bit of the main bitmap B 1350 corresponding to the copied data (Step 4330) to return back to the processing in Step 4270.

Figure 23:
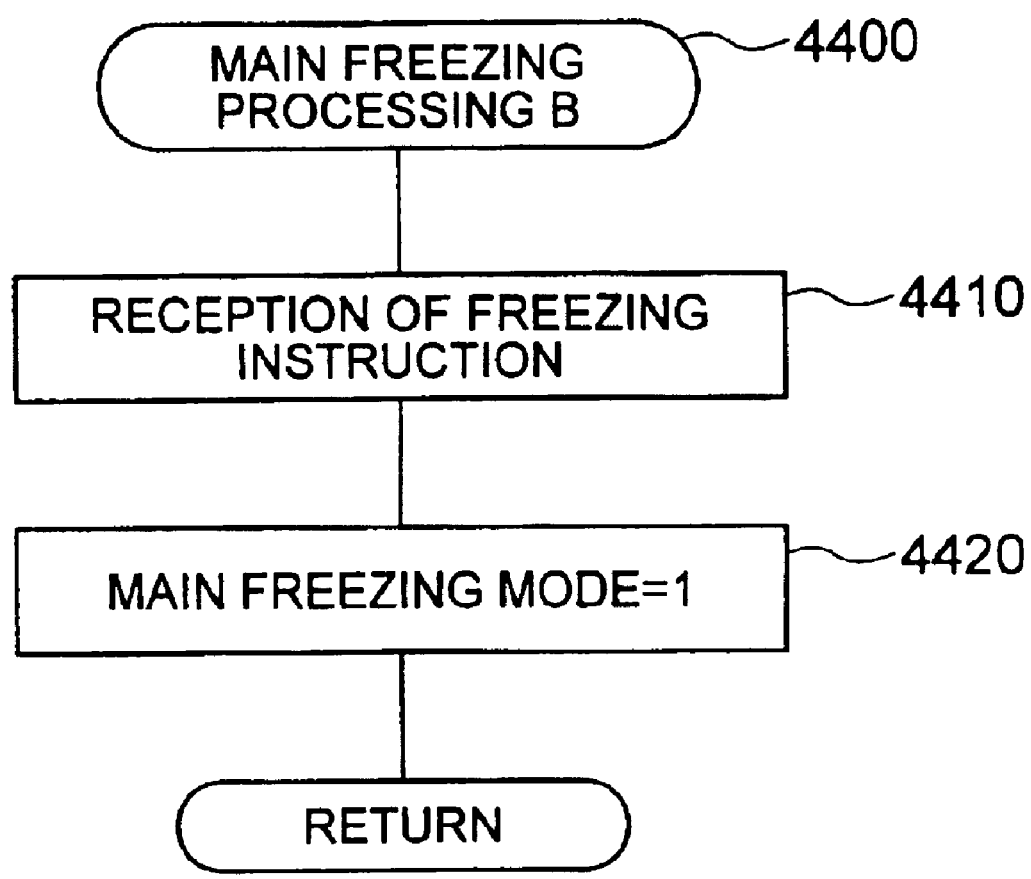
FIG. 23 is a flow chart useful in explaining the main freezing processing B in the third embodiment.

FIG. 23 is a flow chart useful in explaining a main freezing processing B 4400 which the main DKC 1030" executes when the host computer 1010 has issued the freeze instruction to the main DKC 1030".

After having received the freeze instruction from the host computer 1010 (Step 4410), the main DKC 1030" sets to 1 the main freezing mode 1060 to complete the main freezing processing B 4400 (Step 4420).

Figure 24:
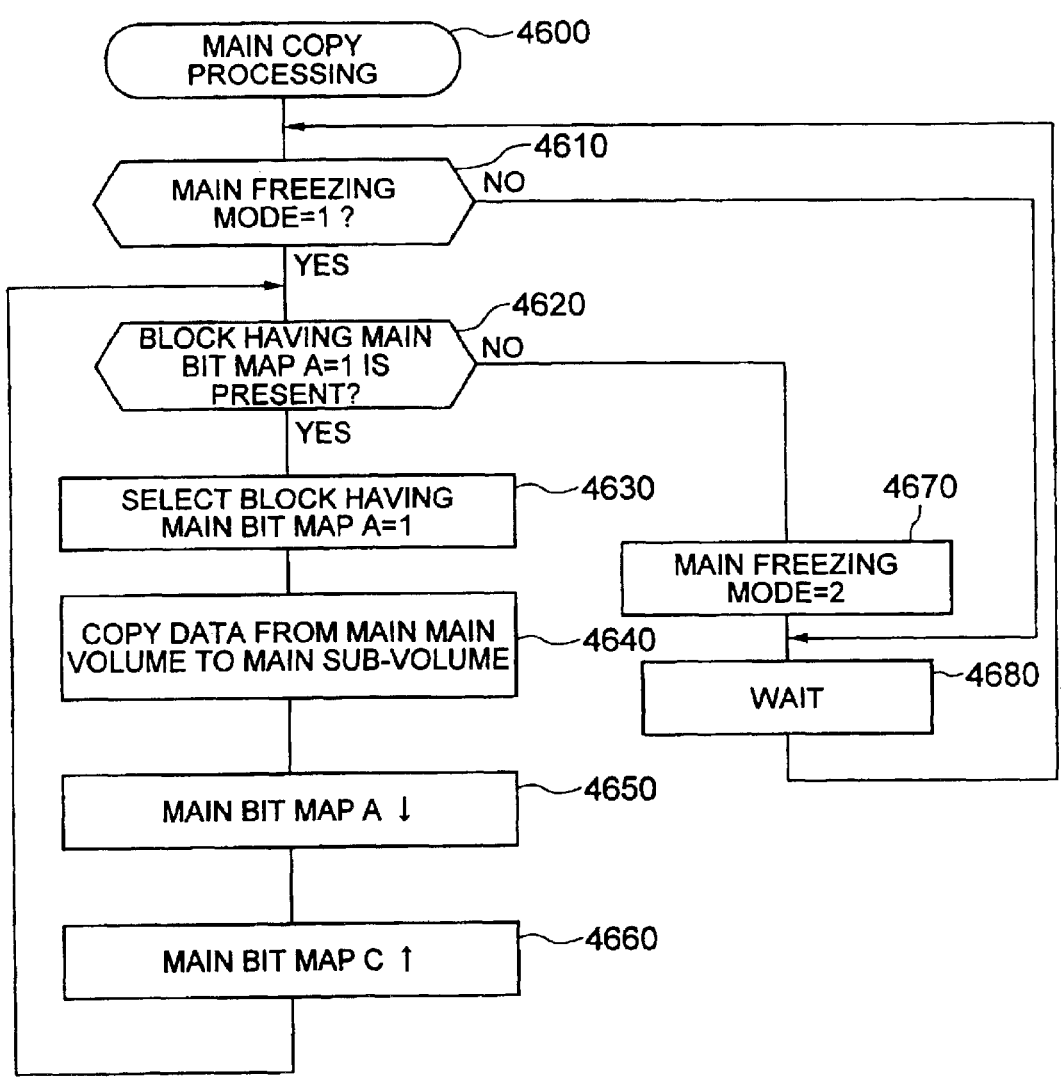
FIG. 24 is a flow chart useful in explaining the main copy processing B in the third embodiment.

FIG. 24 is a flow chart useful in explaining a main copy processing 4600 which is activated by the main DKC 1030" at the time when turning ON the power source of the main storage apparatus system 1180, and thereafter the main DKC 1030" continues to execute as one task.

The main DKC 1030" judges whether or not the main freezing mode 1060 is 1 (Step 4610). If it is determined in Step 4610 that the main freezing mode 1060 is 1, then the main DKC 1030" judges whether or not the bit of 1 is present in the bits contained in the main bitmap A 1340 (Step 4620).

If it is determined in Step 4610 that the bit of 1 is present in the bits contained in the main bitmap A 1340, then the main DKC 1030" controls the main disk unit 1130" in such a way that the block corresponding to the bit of interest is selected (Step 4630), and the data of the block corresponding to the bit of the main main volume 1300 thus selected is copied to the corresponding block of the main sub-volume 1310 (Step 4640).

After completion of the copy, the main DKC 1030" sets to zero the corresponding bit of the main bitmap A 1340 (Step 4650), while sets to 1 the corresponding bit of the main bitmap C 1360 to return back to the processing in Step 4620 (Step 4660).

On the other hand, if it is determined in Step 4610 that the main freezing mode is not 1, then the main DKC 1030" executes the processing in Step 4680.

In addition, if it is determined in Step 4620 that the bit of 1 is absent in the main bitmap A 1340, then the main DKC 1030" sets to 2 the main freezing mode 1060 (Step 4670), and carries out waiting for some time to return back to the processing in Step 4610 (Step 4680).

Figure 25:
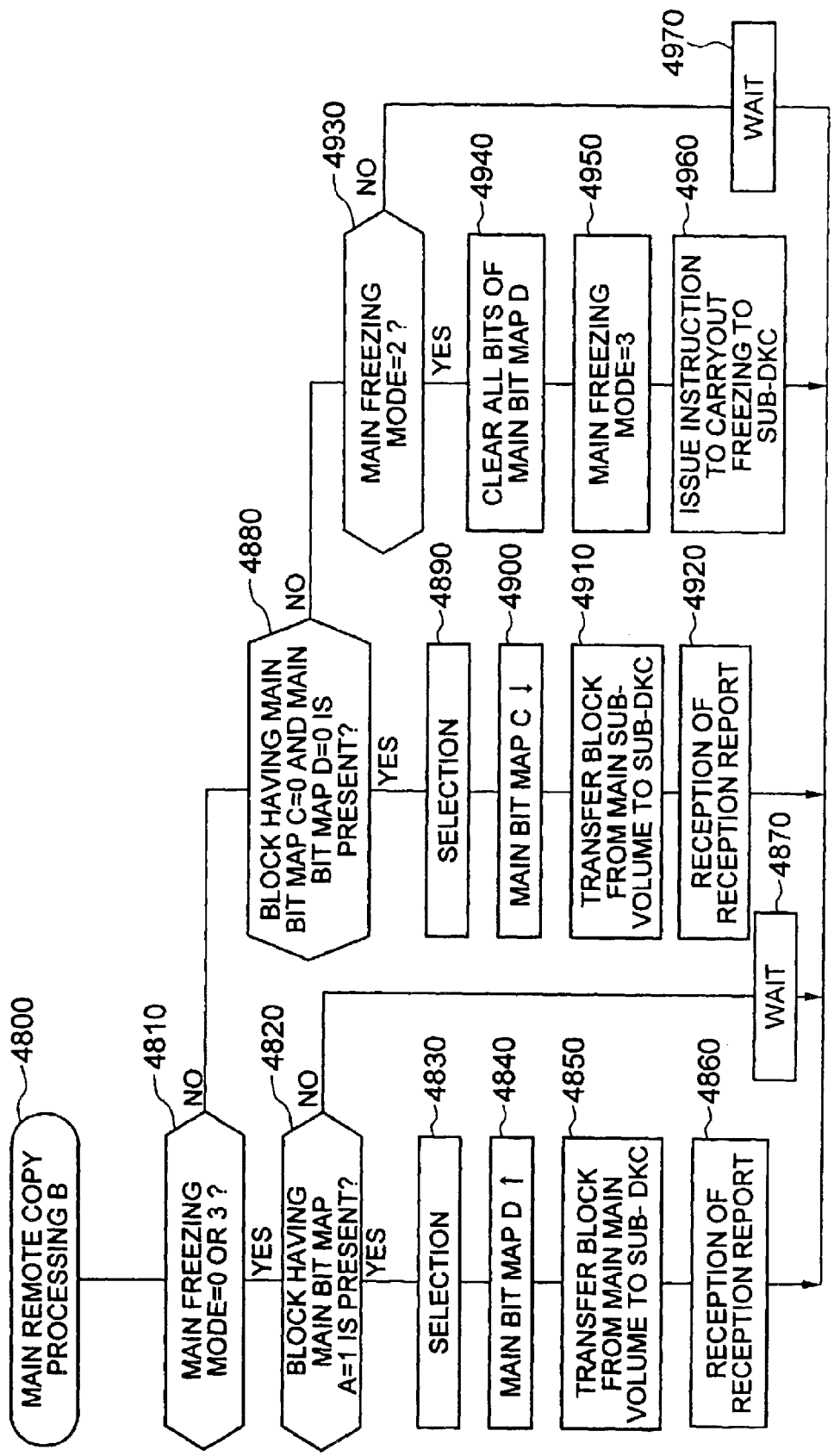
FIG. 25 is a flow chart useful in explaining the main remote copy processing B in the third embodiment.

FIG. 25 is a flow chart useful in explaining a main remote copy processing 4800 which is activated by the main DKC 1030" at the time when turning ON the power source of the main source apparatus system and which the main DKC 1030" executes as one task.

The main DKC 1030" judges whether the main freezing mode 1060 is zero or 3 (Step 4810). If it is determined in Step 4810 that the main freezing mode 1060 is zero or 3, then the main DKC 1030" judges whether or not the block in which the bit of the main bitmap A 1340 is 1 is present (Step 4820). If so, the main DKC 1030" selects the block of interest (Step 4830).

The main DKC 1030" sets to 1 the bit of the main bitmap D 1380 corresponding to the selected block (Step 4840) to read out the corresponding block from the main main-volume 1300 to transmit the block thus read out to the sub-DKC 1040" (Step 4850).

The main DKC 1030" receives the report exhibiting the reception of the data from the sub-DKC 1040" to return back to the processing in Step 4810 (Step 4860).

On the other hand, if it is determined in Step 4820 that the block in which the bit of the main bitmap A 1340 is 1 is absent, then the main DKC 1030" carries out step of waiting for some time (for about several milliseconds) to return back to the processing in Step 4810 (Step 4870).

In addition, if it is determined in Step 4810 that the main freezing mode 1060 is neither zero nor 3, then the main DKC 1030" judges whether or not the block is present in which the main bitmap C 1360 is 1 and also the main bitmap D 1380 is zero (Step 4880).

If it is determined in Step 4880 that the block fulfilling the above-mentioned conditions is present, then the main DKC 1030" selects the block of interest (Step 4890) to set to zero the corresponding bit of the main bitmap C 1360 (Step 4900). The main DKC 1030" reads out the block thus selected from the main sub-volume 1310 to transfer the block thus read out to the sub-DKC 1040" (Step 4910).

The main DKC 1030" receives the report exhibiting the reception of the data from the sub-DKC 1040" to return back to the processing in Step 4810 (Step 4920).

On the other hand, if it is determined in Step 4880 that the block is not present in which the main bitmap C 1360 is 1 and also the main bitmap D 1380 is zero, then the main DKC 1030" judges whether or not the main freezing mode 1060 is 2 (Step 4930).

If it is determined in Step 4930 that the main freezing mode 1060 is 2, then the main DKC 1030" clears all of the bits in the main bitmap D 1380 to zero (Step 4940), and sets to 3 the main freezing mode 1060 (Step 4950) and then issues the freeze instruction to the sub-DKC 1040" to return back to the processing in Step 4810 (Step 4960). On the other hand, if it is determined in Step 4930 that the main freezing mode 1060 is not 2, then the main DKC 1030" carried out the step of waiting for some time (for about several milliseconds) to return back to the processing in Step 4810 (Step 4970).

Figure 26:
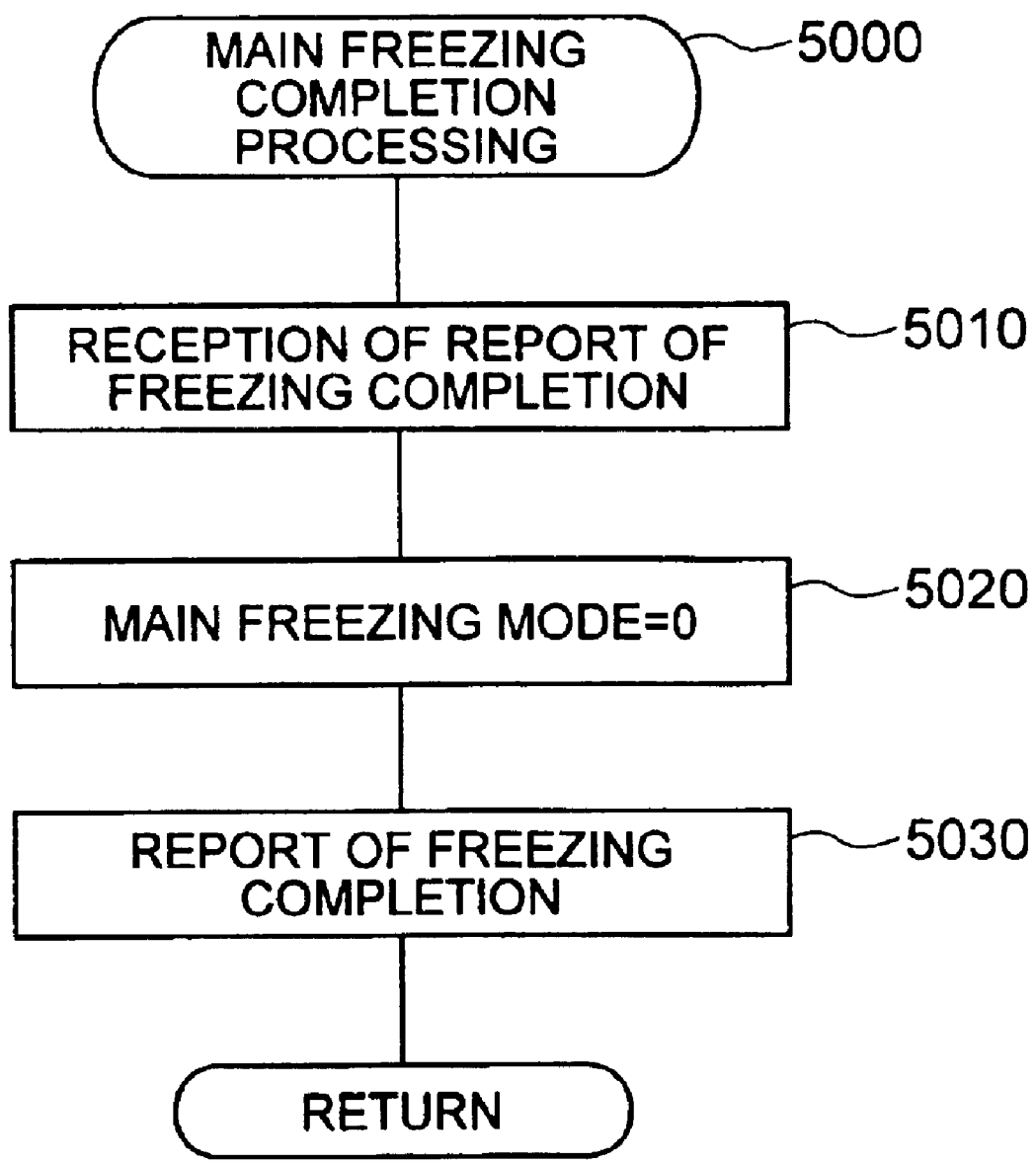
FIG. 26 is a flow chart useful in explaining the main freezing completion processing in the third embodiment.

FIG. 26 is a flow chart useful in explaining a main freezing completion processing 5000 which the main DKC 1030" executes at the time when having received the report exhibiting the completion of the freezing from the sub-DKC 1040".

After having received the report exhibiting the freezing completion from the sub-DKC 1040" (Step 5010), the main DKC 1030" sets to zero the main freezing mode 1060 (Step 5020) and informs the host computer 1010 of the freezing completion to complete the main freezing completion processing 5000 (Step 5030).

Figure 27:
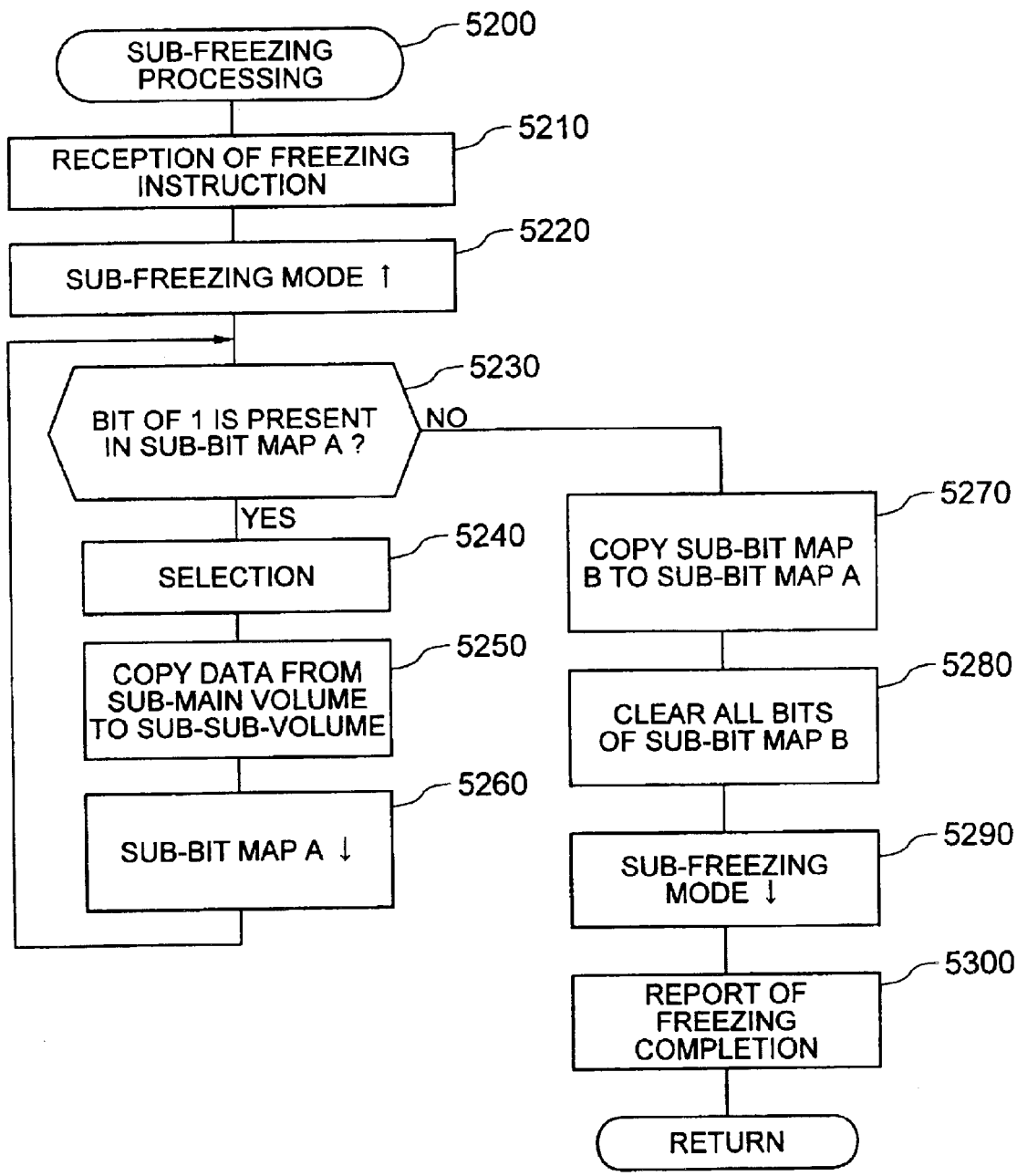
FIG. 27 is a flow chart useful in explaining the sub-freezing processing in the third embodiment.

FIG. 27 is a flow chart useful in explaining a sub-freezing processing 5200 which the sub-DKC 1040" executes at the time when the main DKC 1030" has issued the freeze instruction to the sub-DKC 1040".

After having received the freeze instruction from the main DKC 1030" (Step 5210), the sub-DKC 1040" makes the ON state the sub-freezing mode 1090 (Step 5220) to judge whether or not the bit of 1 is present in the sub-bitmap A 1370 (Step 5230).

If it is determined in Step 5230 that the bit of 1 is present in the sub-bitmap A 1370, then the sub-DKC 1040" controls the sub-disk unit 1160' in such a way that the block corresponding to the bit of interest is selected (Step 5240), and the block thus selected of the sub-main-volume 1320 is read out to be copied to the corresponding block of the sub-sub-volume 1330 (Step 5250).

The sub-DKC 1040" sets to zero the corresponding bit of the sub-bitmap A 1370 to return back to processing in Step 5230 (Step 5260).

On the other hand, if it is determined in Step 5230 that the bit of 1 is absent in the sub-bitmap A 1370, then the sub-DKC 1040" copies the sub-bitmap B 1390 to the sub-bitmap A 1370 (Step 5270) to make all of the bits of the sub-bitmap B 1390 to zero (Step 5280).

The sub-DKC 1040" makes the OFF state the sub-freezing mode 1090 (Step 5290) and informs the main DKC 1040" of the freezing completion to complete the sub-freezing processing 5200 (Step 5300).

Figure 28:
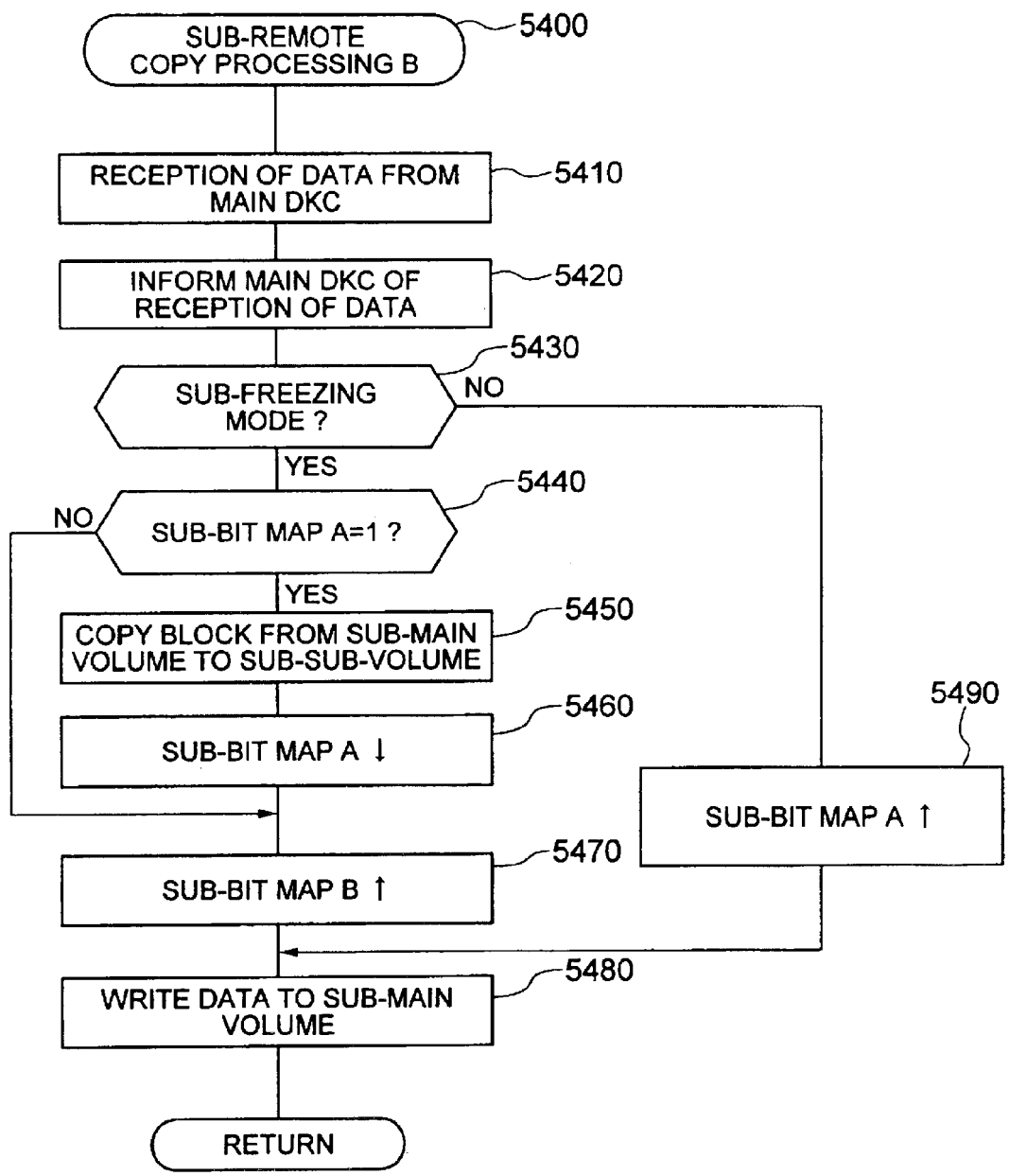
FIG. 28 is a flow chart useful in explaining the sub-remote copy processing B in the third embodiment.

FIG. 28 is a flow chart useful in explaining a sub-remote copy processing B 5400 which the sub-DKC 1040" executes at the time when in Step 4910 in the main remote copy processing B 4800, the main DKC 1030" remote-copies the data to the sub-DKC 1040".

After having received the data from the main DKC 1030" (Step 5410), the sub-DKC 1040" informs the main DKC 1030" of the reception of the data (Step 5420).

Thereafter, the sub-DKC 1040" judges whether or not the sub-freezing mode 1090 is in the ON state (Step 5430). If it is determined in Step 5430 that the sub-freezing mode 1090 is in the ON state, then the sub-DKC 1040" judges whether or not that the bit of 1 is present in the sub-bitmap A 1370 (Step 5440). If it is determined in Step 5440 that the bit of 1 is absent in the sub-bitmap A 1370, then the sub-DKC 1040" executes the processing in Step 5470.

On the other hand, if it is determined in Step 5440 that the bit of 1 is present in the sub-bitmap A 1370, then the sub-DKC 1040" controls the sub-disk unit 1160" in such a way that the block of the sub-main-volume 1320 corresponding to the bit of 1 is read out to be copied to the corresponding block of the sub-sub-volume 1330 (Step 5450).

The sub-DKC 1040" sets to zero the corresponding bit of the sub-bitmap A 1370 (Step 5460), while sets to 1 the corresponding bit of the sub-bitmap B 1390 (Step 5470). The sub-DKC 1040" controls the sub-disk unit 1160' in such a way that the received data is written to the sub-main volume 1320 to complete the sub-remote copy processing B 5400 (Step 5480).

On the other hand, if it is determined in Step 5430 that the sub-freezing mode 1090 is in the OFF state, then the sub-DKC 1040" makes 1 the corresponding bit of the sub-bitmap A 1370 to execute the processing in Step 5480 (Step 5490).

In the present embodiment, since the volume image of the main main-volume 1300 at a time point when the host computer 1010 issued the freeze instruction last time is held in the form of the data stored in the sub-sub-volume 1330 or in the form of the combination of the data which is stored in the sub-sub-volume 1330 and the sub-main-volume 1320, the processing corresponding to the sub-recovery processing 3000 becomes unnecessary.

When the request to read the data has been made from the host computer 1010, the data of the main main-volume 1300 may be transferred thereto.

Next, a fourth embodiment of the present invention will hereinafter be described.

A point of difference of the fourth embodiment from other embodiments is that the data which is transferred from the main storage apparatus system 1130 to the sub-storage apparatus system 1160 is encrypted.

The fourth embodiment will now be described on the basis of the second embodiment. But, it goes without saying that in the first embodiment and the third embodiment as well, the present embodiment can be adopted.

In the present embodiment, when the data is transferred from the main main-volume 1300 to the main sub-volume 1310, the data to be transferred is encrypted (encoded).

In addition, the encrypted data is transferred from the main sub-volume 1310 to the sub-main-volume 1320, and when the encrypted data is copied from the sub-main-volume 1320 to the sub-sub-volume 1330, the data of interest is decoded.

As a result, the encrypted data will be transferred on the network 1050. The description will hereinbelow be given with respect to a point of difference from the second embodiment.

In the present embodiment, in FIG. 13B, the data is copied from the main main-volume 1300 to the main sub-volume 1310 while the data is encrypted (encoded) (indicated by an arrow L 210).

In addition, in FIG. 13D, in the sub-DKC 1040', the data is copied from the sub-main-volume 1320 to the sub-sub-volume 1330 while the encrypted data is decoded (indicated by an arrow P 250).

In FIG. 14, the stored data is encrypted when the main DKC 1030' is split. In addition, when the sub-DKC 1040' is split, the stored data which is already encrypted is decoded.

In Step 3440 shown in FIG. 15, the main DKC 1030' copies the data stored in the corresponding block from the main main-volume 1300 to the main sub-volume 1310 after the encryption of the data of interest.

In Step 3650 shown in FIG. 16, the main DKC 1030' controls the main disk unit 1130' in such a way that the corresponding block of the main main-volume 1300 is read out to be encrypted, and the encrypted data is copied to the main sub-volume 1310.

In Step 4030 shown in FIG. 18, the sub-DKC 1040' controls the sub-disk unit 1160' in such a way that the corresponding block of the sub-main-volume 1320 is read out to the sub-DKC 1040' and the encrypted data is decoded to be copied to the corresponding block of the sub-sub-volume 1330.

By adopting the configuration of the present embodiment, the volume image in the freezing can be ensured in any one of the disk units while ensuring the safety of the data which is being transferred.

By adopting the configuration of the present invention, even when the remote copy of no guarantee to order is carried out, the volume image having excellent coherency can be ensured.

While the present invention has been particularly shown and described with reference to the preferred embodiments, it will be understood that the various changes and modifications will occur to those skilled in the art without departing from the scope and true spirit of the invention. The scope of the invention is therefor to be determined solely by the appended claims.

What is claimed is:

1. A large area data storage system comprising:
   a first storage sub-system located in a first data center, comprising a first computer system configured to receive storage access requests from one or more user systems and to process the storage access requests and a first data storage system operative with the first computer system to satisfy received storage requests, the first data storage system comprising a plurality of data volumes including a primary volume and a primary difference volume;
   a second storage sub-system located in a second data center; and
   a third sub-system located in a third data center, comprising a second computer system and a second data storage system operative with the second computer system, the second data storage system comprising a plurality of data volumes including a secondary volume and a secondary difference volume,
   the first and second storage sub-systems each configured to synchronously transmit data to the second storage sub-system,
   the first data storage system configured to perform steps of storing data received from the first computer system to the primary volume and communicating blocks of data from the primary volume to the second data storage system, and in response to receiving a first command from the first computer system:
      selectively storing subsequent data received from the first computer system to the primary difference volume;
      communicating blocks of data from the primary volume to the second data storage system; and upon completing the step of communicating blocks of data, communicating a first signal to the second data storage system, the second data storage system configured to perform steps of storing data received from the first data storage system to the secondary difference volume, and in response to receiving the first signal, copying data contained in the secondary difference volume to the secondary volume.

2. The data system of claim 1 wherein the second sub-system is configured to perform, in response to the first sub-system becoming unavailable, a takeover operation and a data transfer state inquiry of the third sub-system.

3. The data system of claim 2, wherein a transfer state bit map is provided in each of the second sub-system and the third sub-system, wherein a response to the data transfer state inquiry is based on the transfer state bit maps.

* * * * *